(12) United States Patent
Imai et al.

(10) Patent No.: US 10,708,239 B2
(45) Date of Patent: Jul. 7, 2020

(54) EDGE SERVER, ENCRYPTION COMMUNICATION CONTROL METHOD THEREOF, AND TERMINAL

(71) Applicant: FUJITSU LIMITED, Kawasaki-shi, Kanagawa (JP)

(72) Inventors: Satoshi Imai, Kawasaki (JP); Motoyoshi Sekiya, Chigasaki (JP); Toru Katagiri, Kawasaki (JP); Tetsuya Yamada, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 187 days.

(21) Appl. No.: 15/714,359

(22) Filed: Sep. 25, 2017

(65) Prior Publication Data
US 2018/0103013 A1   Apr. 12, 2018

(30) Foreign Application Priority Data

Oct. 11, 2016   (JP) .................................. 2016-199945

(51) Int. Cl.
*H04L 29/06* (2006.01)
*H04W 12/06* (2009.01)
(Continued)

(52) U.S. Cl.
CPC ........ *H04L 63/0428* (2013.01); *H04L 9/0819* (2013.01); *H04L 63/06* (2013.01); *H04L 63/061* (2013.01); *H04L 63/08* (2013.01); *H04W 12/06* (2013.01); *H04W 36/0033* (2013.01); *H04L 63/0823* (2013.01); *H04L 63/166* (2013.01); *H04W 12/04* (2013.01)

(58) Field of Classification Search
CPC ... H04L 63/0428; H04L 9/0819; H04L 63/06; H04L 63/061; H04L 63/08; H04W 12/06; H04W 36/0033; H04W 63/0823; H04W 63/166; H04W 12/04
See application file for complete search history.

(56) References Cited

U.S. PATENT DOCUMENTS 9,729,675 B2 * 8/2017 Luecke ................. H04L 67/327
2004/0077335 A1   4/2004 Lee et al.
(Continued)

FOREIGN PATENT DOCUMENTS

| CN | 101635923 A | 1/2010 |
| JP | 2005-065004 A | 3/2005 |
| JP | 2016-200954 A | 12/2016 |

OTHER PUBLICATIONS

European Office Action of European Patent Application No. 17 193 318.7 dated Jul. 2, 2018.
(Continued)

*Primary Examiner* — Techane Gergiso
(74) *Attorney, Agent, or Firm* — Arent Fox, LLP

(57) ABSTRACT

An edge server disposed on an edge of a cloud network, includes: a processor, wherein when encryption key information relating to a terminal which requests a connection to the edge server and the encryption key information generated before the request, is included in shared information shared between a cloud server and another edge server in the cloud network, the processor is configured to start encryption communication with the terminal using the encryption key information of the shared information.

12 Claims, 28 Drawing Sheets

(51) Int. Cl.
*H04W 36/00* (2009.01)
*H04L 9/08* (2006.01)
*H04W 12/04* (2009.01)

(56) References Cited

U.S. PATENT DOCUMENTS

| | | | | |
|---|---|---|---|---|
| 2012/0159180 | A1* | 6/2012 | Chase | G06F 21/6227 |
| | | | | 713/183 |
| 2014/0081932 | A1* | 3/2014 | Krislov | G06F 21/6209 |
| | | | | 707/694 |
| 2014/0310513 | A1* | 10/2014 | Barney | H04L 63/0428 |
| | | | | 713/153 |
| 2014/0337500 | A1* | 11/2014 | Lee | H04L 41/12 |
| | | | | 709/223 |
| 2015/0055623 | A1* | 2/2015 | Li | H04W 40/04 |
| | | | | 370/331 |
| 2015/0106624 | A1* | 4/2015 | Gero | H04L 9/0643 |
| | | | | 713/171 |
| 2015/0331635 | A1* | 11/2015 | Ben-Shaul | G06F 9/5061 |
| | | | | 711/120 |
| 2016/0094585 | A1* | 3/2016 | Shahbazian | H04L 63/205 |
| | | | | 726/1 |
| 2016/0301695 | A1* | 10/2016 | Trivelpiece | H04W 4/70 |
| 2016/0321654 | A1* | 11/2016 | Lesavich | G06F 21/6245 |
| 2017/0046134 | A1* | 2/2017 | Straub | G06F 8/36 |
| 2017/0277909 | A1* | 9/2017 | Kraemer | G06F 21/6245 |
| 2017/0295132 | A1* | 10/2017 | Li | H04L 61/1511 |
| 2018/0225831 | A1* | 8/2018 | Muramatsu | H04N 7/188 |

OTHER PUBLICATIONS

Nomura Research Institute, "Survey on Blockchain Technologies and Related Services," FY2015 Report, XP055486903, Mar. 31, 2016.
European Office Action of corresponding European Patent Application No. 17 193 318.7 dated Jan. 10, 2019.
Extended European Search Report of European Patent Application No. 17193318.7 dated Feb. 16, 2018.
European Office Action of corresponding European Patent Application No. 17 193 318.7 dated Apr. 9, 2019.
European Office Action issued by the European Patent Office in corresponding European Patent Application No. 17193318.7 dated Oct. 31, 2019.

* cited by examiner

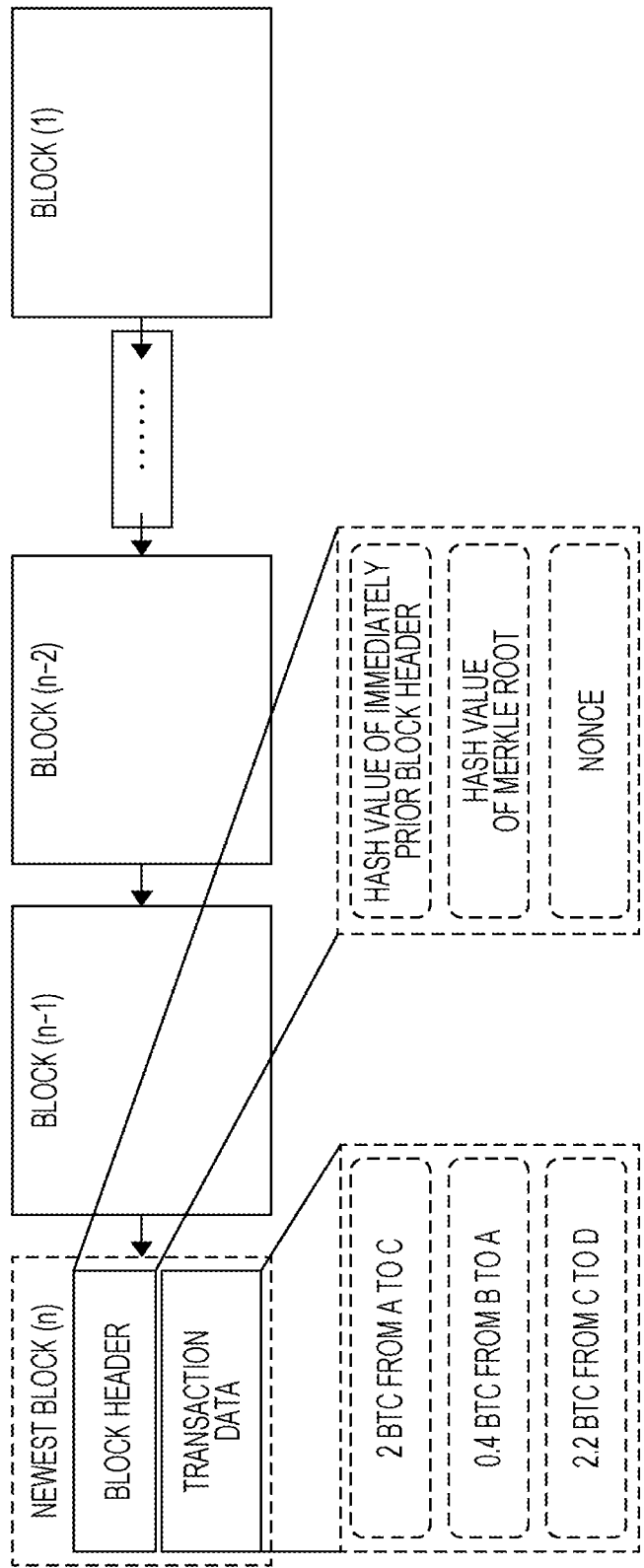

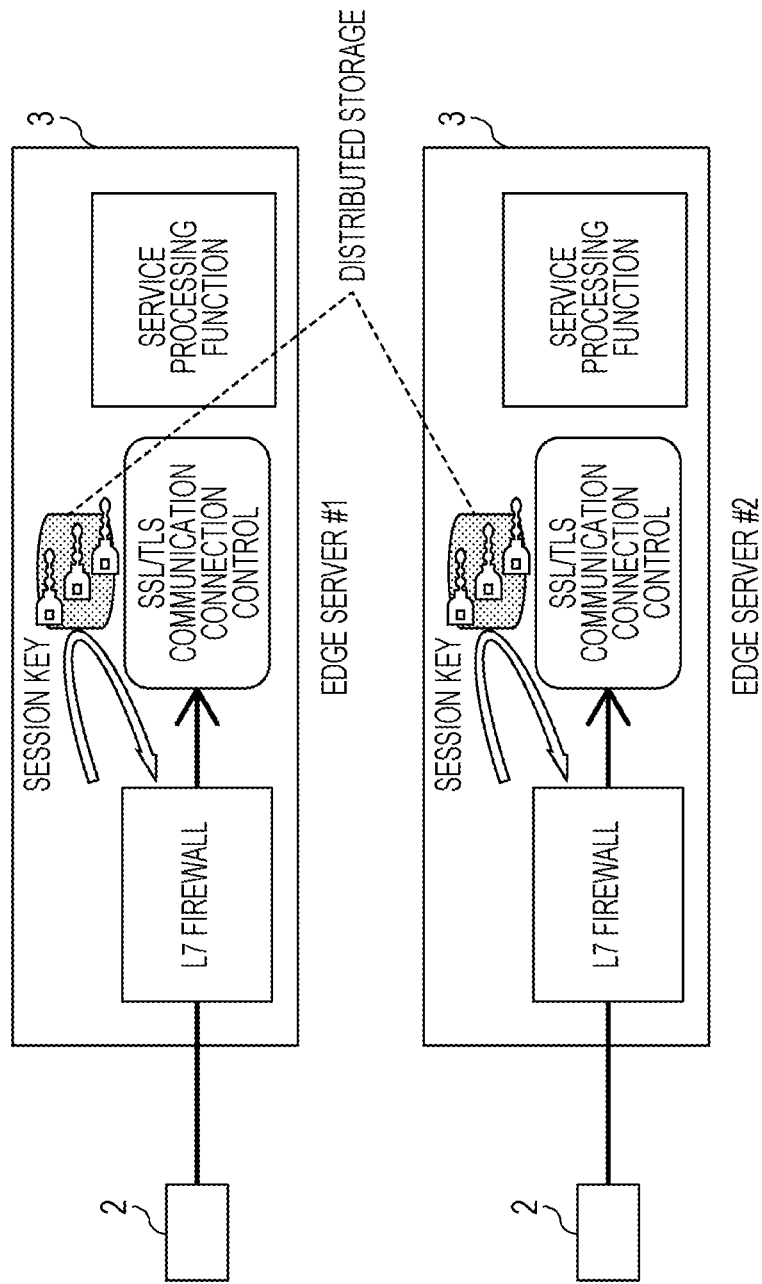

EDGE SERVER, ENCRYPTION COMMUNICATION CONTROL METHOD THEREOF, AND TERMINAL

CROSS-REFERENCE TO RELATED APPLICATION

This application is based upon and claims the benefit of priority of the prior Japanese Patent Application No. 2016-199945, filed on Oct. 11, 2016, the entire contents of which are incorporated herein by reference.

FIELD

The embodiments discussed herein are related to an edge server, encryption communication control method thereof, and a terminal.

BACKGROUND

In cloud computing, a single or multiple servers having data accumulating and information processing functions for providing services to terminals are disposed in a cloud (network).

Edge computing is one type of distributed computing environments. In the edge computing, multiple computers are prepared at positions (edges of the network) between a server that provides cloud services and a terminal. The computers are called "edge node", "edge server", "edge gateway", and others.

In the edge computing, the abovementioned data accumulating and information processing functions are distributed and disposed in the multiple edge servers. The edge server disposed at a position closer to the terminal than the server to the terminal shortens the transmission delay of the network.

Related technologies are disclosed for example in Japanese Laid-open Patent Publication No. 2005-65004 and Japanese Patent No. 5858506.

The communication is encrypted in some cases when the cloud service is in use. Secure Sockets Layer (SSL)/Transport Layer Security (TLS) or the like, for example, is applied as a protocol for encryption. In the SSL/TLS, before the communication is started, verification of the certificates and exchange of keys are performed between a terminal and a cloud server (service provider), and data encrypted using the key is transmitted and received. It is considered that encryption communication is performed between the terminal and the edge server also in the edge computing.

Under the environment of the edge computing, there could be a case where a terminal has mobility or portability and an edge server as a connection destination is changed in accordance with a position of the terminal. In this case, it takes time for the terminal to perform again the encryption procedure (verification of the certificates and exchange of keys) with a new edge server. If it takes time to perform the encryption procedure, it possibly impairs the significance of disposing the edge server at a position closer to the terminal than the cloud server to the terminal.

With the one aspect, a period of time before the edge server starts encryption communication with a terminal requesting a connection is allowed to be shortened.

SUMMARY

According to an aspect of the embodiments, an edge server disposed on an edge of a cloud network, includes: a processor, wherein when encryption key information relating to a terminal which requests a connection to the edge server and the encryption key information generated before the request, is included in shared information shared between a cloud server and another edge server in the cloud network, the processor is configured to start encryption communication with the terminal using the encryption key information of the shared information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 1 schematically illustrates a blockchain (BC);

FIG. 30 schematically illustrates a case where a firewall of a layer is arranged in a gateway of the edge server.

DESCRIPTION OF EMBODIMENTS

Figure 2A:
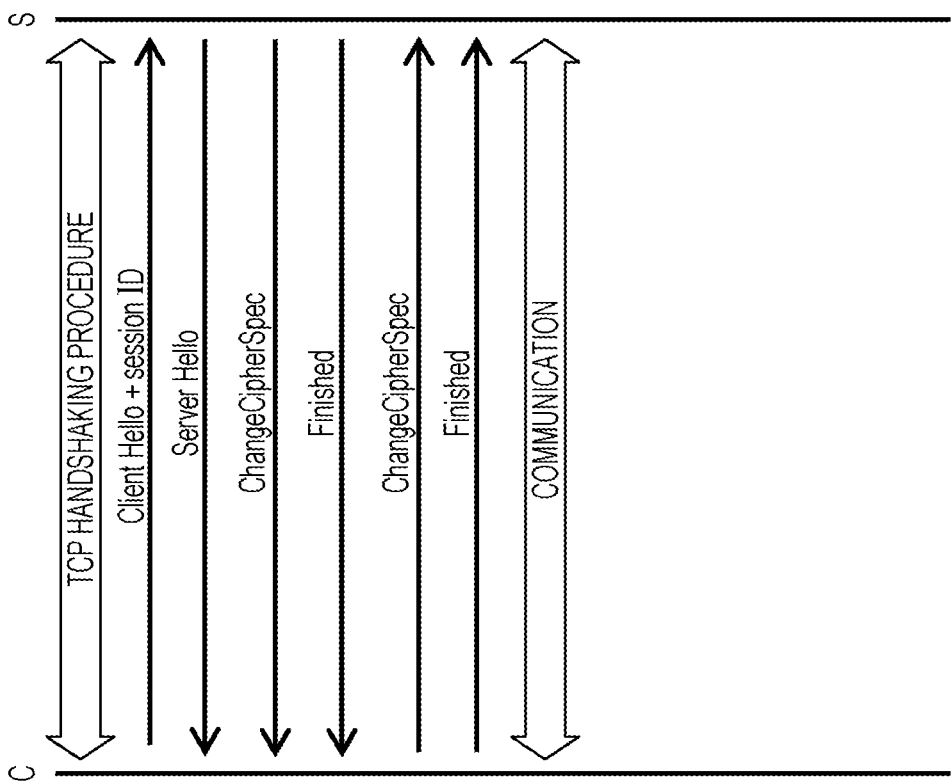
FIGS. 2A and 2B are basic sequence examples of SSL/TLS.

Hereinafter, an embodiment will be described with reference to the drawings. Note that, the configurations of the embodiment are merely examples, and are not limiting configurations.

In the embodiment, using a computing machine infrastructure formed by multiple edge servers, an edge computing system that manages and controls a connection of a terminal (device) to the edge server, and execution of a service provided to the terminal will be described.

In the embodiment, the edge servers and a cloud (service provider) share information (SSL/TLS session information) on encryption communication, which is generated in a first connection of the terminal to the edge server, on a distributed storage. The distributed storage is formed, for example, by information being distributed and disposed to multiple storages that are present in the edge servers and the cloud. In the second and subsequent connection of the terminal, the information on the encryption communication stored in the distributed storage is utilized. This shortens time taken to change the edge server that is a connection destination of the terminal.

Prior to the explanation of the embodiment, the overviews of "blockchain (BC)" and "SSL/TLS" used in the embodiment will be described.

<Block Chain (BC)>

The blockchain is a distributed ledger technology or a distributed network used in a virtual currency (such as bitcoin), and is a mechanism to cause multiple nodes to synchronize the same record. In the BC, a ledger on which contracts or transactions are recorded is made public, and a user checks the validity of the transaction.

When a service utilizing the BC is started, a public key that is generated from a secret key of the user, and a user ID (such as a bitcoin address) that is generated from the public key are published. The public key and the user ID are retained and made public on the BC. Each user generates the transaction (transaction information), which is broadcasted over the BC network.

The transaction information includes transmission source information, destination information, a transaction main body, a hash value of the prior transaction, and an electronic signature of the transaction main body. The transaction main body includes, for example, a user ID (address) of a payment recipient, and a payment amount from a payment source to the payment recipient. The electronic signature is a hash value of the prior transaction information that is encrypted using a secret key of the payment source.

A user (user who executes verification called "Miner") having received the transaction information decrypts the electronic signature using a public key of a user corresponding to the user ID. If the hash value obtained by the decryption is compared with the hash value (plaintext) in the transaction information, and both are the same, the transaction information is determined (approved) to be valid. Note that, a public key may be used instead of the user ID, or a public key of the payment recipient may be included in the transaction information, in some cases.

FIG. 1 schematically illustrates a blockchain (BC). In the BC, data chunks called "blocks" are connected in a chain shape, and retained on the distributed storage. The block includes a block header and transaction data. The transaction data (list of the transactions) is formed by collecting transaction information on transactions conducted within a certain period. Note that, "BTC" in FIG. 1 indicates a virtual currency unit using bitcoin as an example.

The block header includes a hash value (information related to one prior block from the corresponding block) of an immediately prior block header, a hash value of Merkle root, and Nonce (Number used once: Nonce). The hash value of the Merkle root is a hash value of the tree when the Merkle root relating to the transactions in the list is formed. Nonce is a disposal value used for searching (mining) a hash value that satisfies a predetermined condition.

The block is generated by a block generator called "Miner". Block generation processing is called (proof-of work (PoW)). The Miner repeats the hash calculation until the hash value of the immediately prior block, the hash value of the Merkle root and a hash value obtained from the Nonce satisfy a predetermined condition (n pieces from the head indicate 0) by changing the Nonce. The action searching a Nonce from which the hash value that satisfies this predetermined condition is obtained is called "mining".

A Miner who was able to calculate first a hash value that satisfies the predetermined condition obtains a right to generate a block. The Nonce when the hash that satisfies the predetermined condition is obtained is included in the block, and allows other users to determine that the block is valid (approve the block) by checking that the hash value calculated using the Nonce in the block satisfies the predetermined condition.

In this manner, the transactions are recorded in the distributed storage in a state difficult to be falsified in the BC, and allow each user to monitor the transaction. An attempt to falsify information in the block arises a contradiction of the hash value of the Merkle root or the Nonce, which affects the entire BC, thereby resulting in the construction of a database that is substantially impossible to falsify.

<SSL/TLS>

The SSL/TLS is a protocol for performing communication in which the security is requested, in a computer network. The SSL/TLS provides main functions of authenticating a communication partner, encrypting communication data, and detecting falsification. The SSL/TLS is used between a connection-typed transport layer protocol (for example, Transmission Control Protocol (TCP)) and an application layer in many cases, and serves as a protocol of a session layer in an OSI reference model.

Figure 2B:
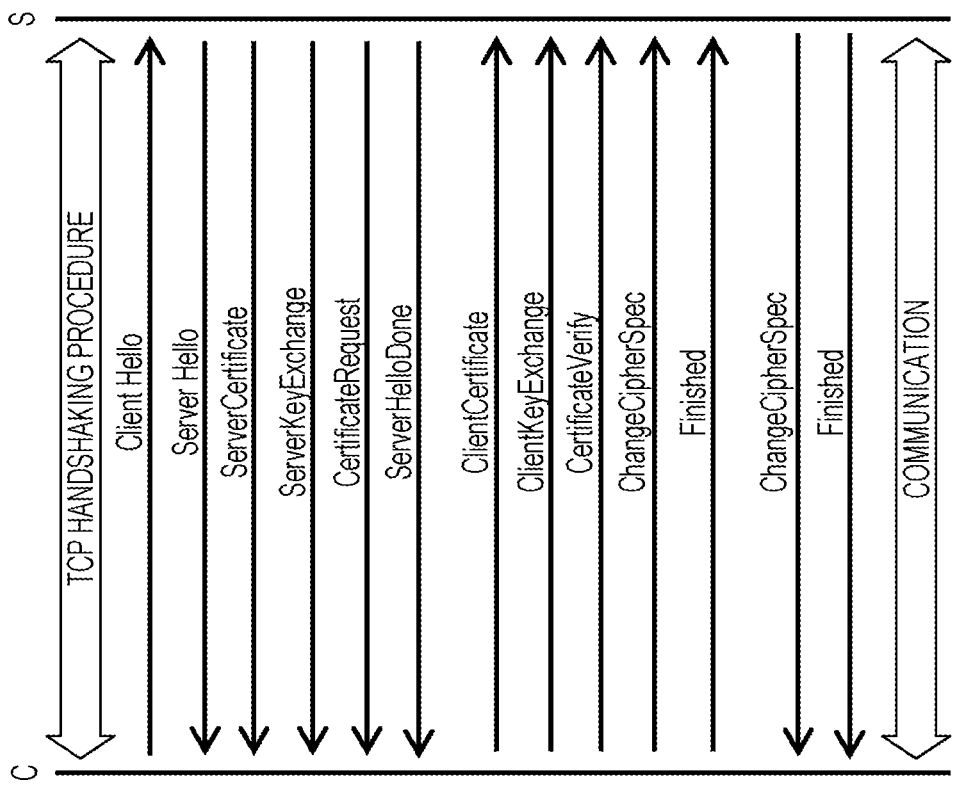

FIGS. 2A and 2B illustrate an example of basic sequences (encryption communication procedures) of the SSL/TLS. FIG. 2A illustrates a procedure of an initial access by a client (C) to a server (S), and FIG. 2B illustrates a procedure of a second or subsequent access (session reuse) by the client (C) to the server (S).

<1. Client Hello>

In FIG. 2A, when a handshaking procedure based on the TCP is completed between the client and the server, the client notifies the server of "Client Hello" indicating the start of the communication. The message "Client Hello" includes the following contents:

A protocol version of the SSL/TLS; a random number (which is used in the subsequent calculation of a common key); a session ID (if the immediate prior access is made, designating this ID allows the session to resume and negotiation to omit); and a list of encryption methods and compression methods of data, which are available for the client. The session identifier is abbreviated as a session ID.

<2. Server Hello>

Upon reception of "Client Hello", the server (S) decides an algorithm of encryption and a hash function to be used, and notifies the client of a message "Server Hello". The server selects an encryption method and a compression method of data from the list transmitted from the client. The message "Server Hello" includes the following contents:

A protocol version of the SSL/TLS; a random number (which is used in the subsequent calculation of a common key); a session ID (which is used when a reconnection is made and a negotiation is omitted); and the encryption method and the compression method of data, which are decided by the server.

<3. Server Certificate (May be Omitted)>

The server transmits a server certificate to be used in SSL/TLS communication, to the client. The transmission of this message may be omitted.

<4. Server Key Exchange (May be Omitted)>

When the server does not transmit the server certificate or when the server certificate transmitted with Server Certificate does not include a public key, the server transmits a public key for exchanging a common key using "Server Key Exchange". The server generates a temporal public key, and transmits the temporal public key with a signature of the server.

<5. Certificate Request (May be Omitted)>

Certificate Request is a message that the server requests the client to transmit a certificate for client authentication, when the authentication of the client is requested. The Certificate Request includes a list of route certificates trusted by the server.

<6. Server Hello Done>

Server Hello Done is used for notifying the client of completion of a series of messages starting from "Server Hello".

<7. Client Certificate (May be Omitted)>

When the client receives Certificate Request from the server, the client transmits the client certificate to the server. When the client does not receive Certificate Request from the server, the transmission of the client certificate is omitted.

<8. Client Key Exchange>

With the foregoing procedure, the client obtains a public key included in the server certificate in Server Certificate. The client generates random number information, called "premaster secret", in order to make a common key that only the server and the client are allowed to know, and encrypts the generated premaster secret using the public key of the server and transmits the encrypted premaster secret to the server. The encrypted premaster secret is deciphered (decrypted) with the secret key that the server has, so that the client and the server share the premaster secret.

<9. Certificate Verify (May be Omitted)>

Certificate Verify is signature data with respect to the client certificate when Client Certificate is transmitted. The client generates a signature (Certificate Verify), and transmits it to the server. The server having received Certificate Verify from the client verifies the signature using the client certificate (Client Certificate). When Certificate Request is not transmitted from the server, Client Certificate is not transmitted either.

<10. Change Cipher Spec>

With the foregoing procedure, the client and the server share the premaster secret. The client and the server respectively generate "master secrets" using the random numbers included in Client Hello and Server Hello, and the premaster secret. In this process, the client and the server respectively generate the master secrets by the same method. In addition, the client and the server respectively generate common keys for using subsequent encryption communication, from the master secrets. The client transmits Change Cipher Spec to the server in order to notify that the encryption communication using the common key is performed.

<11. Finished>

The client notifies the server that the server authentication is succeeded and the common key may be shared. Thereafter, the client encrypts a massage using the common key, and transmits the massage.

<12. Change Cipher Spec, 13. Finished>

The server transmits Change Cipher Spec to the client in order to notify that the encryption communication using the common key is performed. Moreover, the server transmits Finished to the client to notify the client of the authentication success and the common key sharing.

Note that, in the SSL/TLS communication, the client may temporarily store (cache) session information including the communication key and the certificate when the session is disconnected. The client may omit the above-described processes from 3 to 9 by designating the session ID (including the session ID in Client Hello) when transmitting Client Hello that requests the server of reconnection (see FIG. 2B). This resume function is called "SSL/TLS Resumption".

"SSL/TLS Resumption" is a function to store (cache) information on an SSL/TLS session established once in association with the ID that is defined by the session, and recover the previous time connection in a reconnection by utilizing the cached information.

The operation of the protocol when the TLS Session resumption is utilized is described in RFC5246 of TLS 1. 2. Client Hello and Server Hello, which are exchanged when the session is established include data called "session id".

The following is performed when the client establishes a new session. The client transmits Client Hello including an empty session id to the server. The server having received the empty session id generates a new session id, and returns the new session id by being included in Server Hello. This allows the client to partially omit the handshaking procedure of the session establishment without performing the verification of the certificate and sharing the key in Server/Client, when the session is resumed.

When the client holds a session id that the client intends to resume, the client sends Client Hello including a value of the session id that the client desires to resume. Each of the server and the client stores information on the established session in the cache using the exchanged session id as a key.

<Network Configuration>

Figure 3:
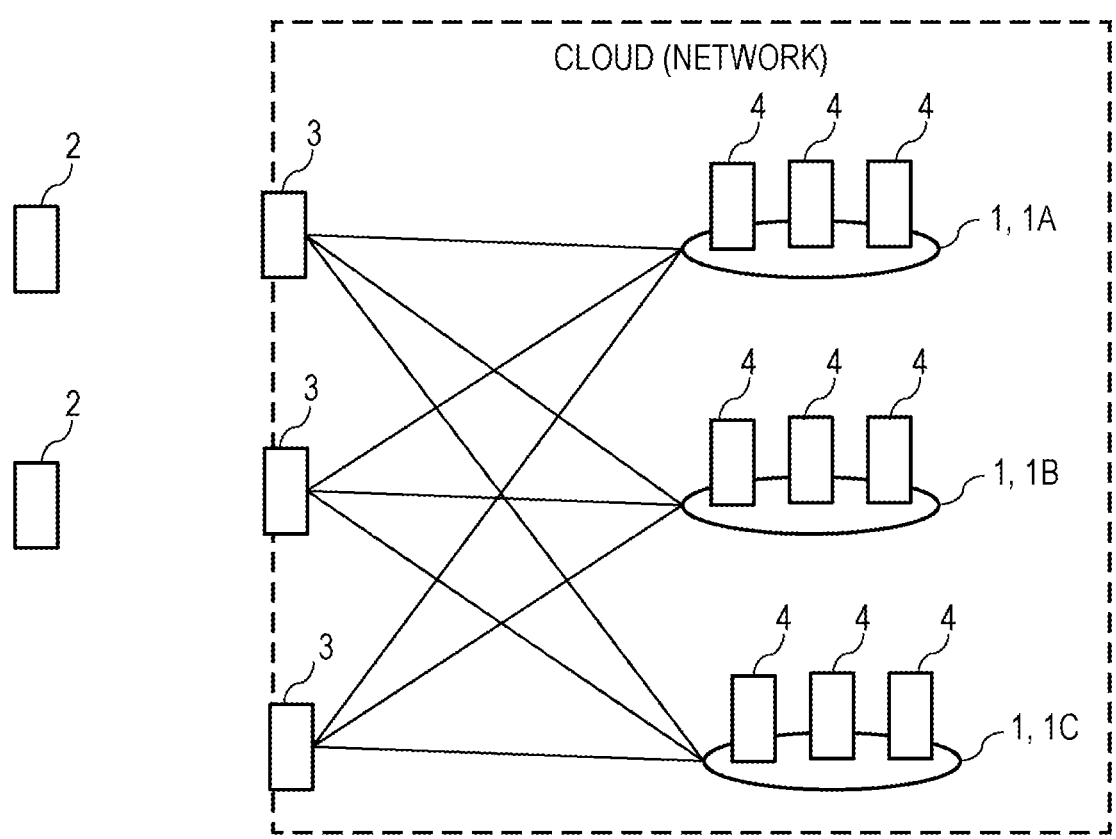
FIG. 3 illustrates a network configuration example according to an embodiment.

FIG. 3 illustrates a network configuration example according to an embodiment. FIG. 3 illustrates an example of a network in accordance with edge computing. In FIG. 3, multiple edge servers 3 are distributed and disposed between multiple data centers 1 connected to a cloud (network) and terminals (devices) 2. Each data center 1 is configured by a single or multiple servers 4. The server 4 functions as a service provider that performs data accumulation or information processing for providing service to the terminal 2. The number of the servers 4 that function as service providers may be a single or a plural number. In the following explanation, the server 4 is called "cloud server" for distinguishing it from the edge server 3 in some cases. The server 4 is an example of "cloud".

The terminal 2 may be a mobile terminal (radio terminal) or may be a fixed terminal. In the embodiment, a case where the terminal 2 is a mobile terminal is described. The mobile terminal includes a vehicle-mounted terminal.

The edge servers 3 are disposed on the edges of the cloud (network). The edge server 3, instead of the server 4, may provide the service requested from the terminal 2. The service provided from the edge server 3 to the terminal 2 may or may not be service that may be provided form the server 4. The multiple servers 4 and the multiple edge servers 3 are mutually connected to form a peer-to-peer (P2P) network.

Figure 4:
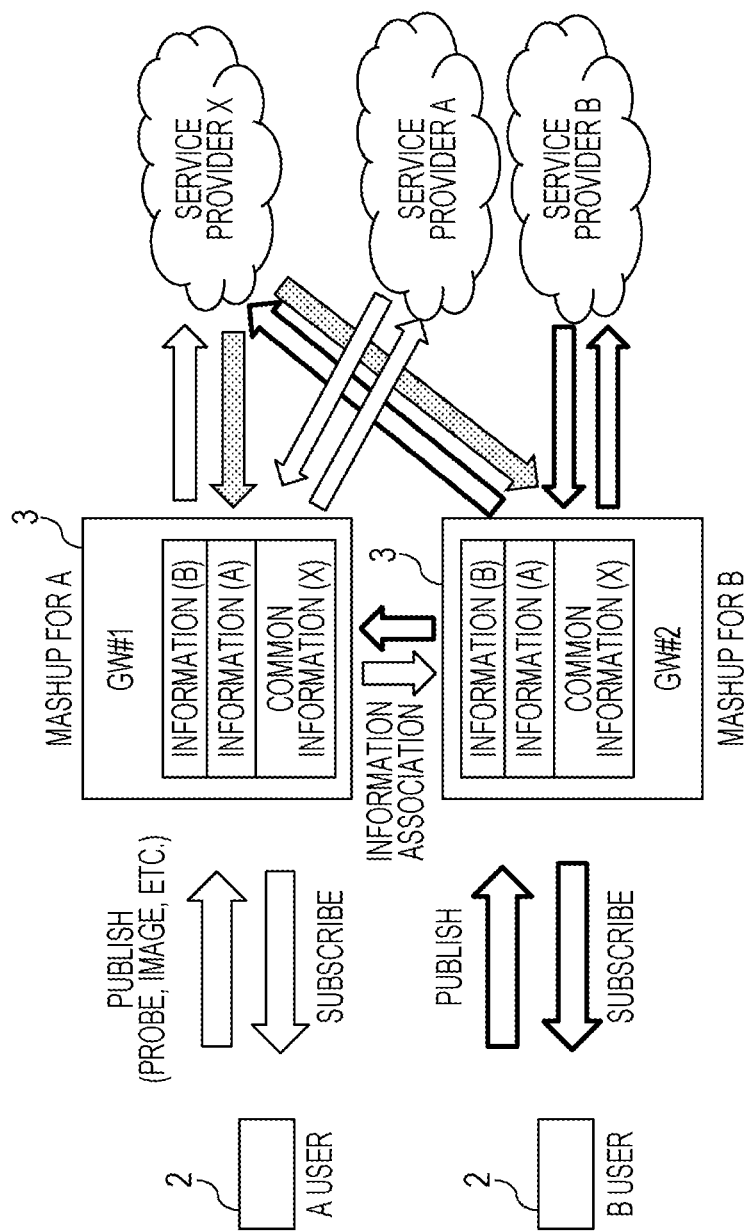
FIG. 4 illustrates an example of a service provision system constructed by a network system illustrated in FIG. 3.

FIG. 4 illustrates an example of a service provision system constructed by the network system illustrated in FIG. 3. For example, the following is assumed. Multiple servers 4 present in a data center 1A function as a service provider X. Multiple servers 4 present in a data center 1B function as a service provider A. Multiple servers 4 present in a data center 1C function as a service provider B.

An edge server 3 (GW #1) obtains information for users of each provider, from each of the service provider A and the service provider B. Moreover, the edge server 3 (GW #1) obtains information common to the users of the service provider A and the users of the service provider B, from the service provider X. The GW #1 performs mashup for the users of the service provider A. The GW #1 performs mashup for the users of the service provider B.

The terminal 2 of the user of the service provider A designates information (contents mashuped for users of the A) to be supplied to subscribers, as a publisher. The terminal 2 may receive information from the GW #1, as a subscriber. The terminal 2 of the user of the service provider B may receive information (contents mashuped for the users of the B) designated by a publisher, as a subscriber. Note that, the abovementioned aspect of the service provision is an example. For example, the edge server 3 may provide information that is provided by each service provider, instead of the service provider (server 4).

<Hardware Configuration>

Figure 5:
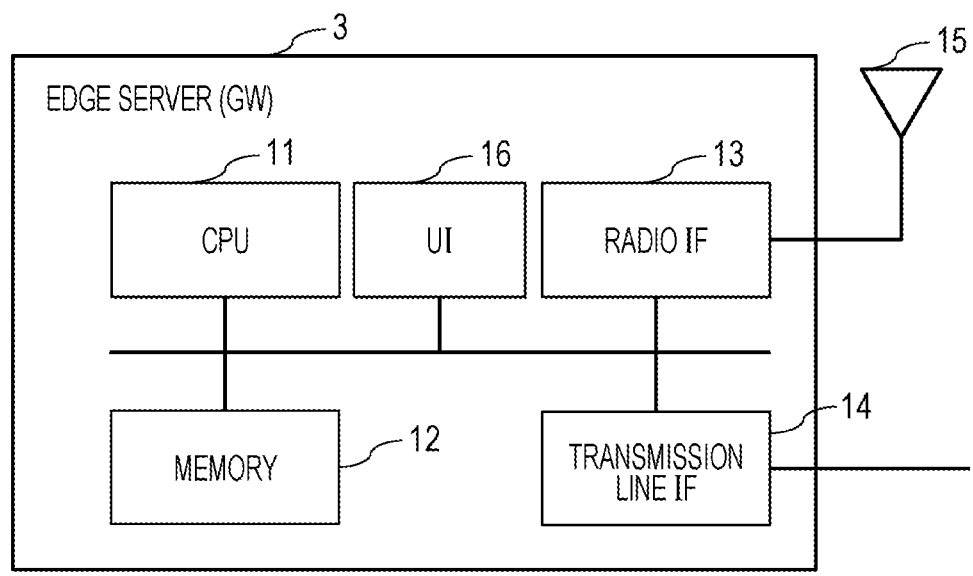
FIG. 5 is a diagram illustrating a hardware configuration example of an edge server.
Figure 6:
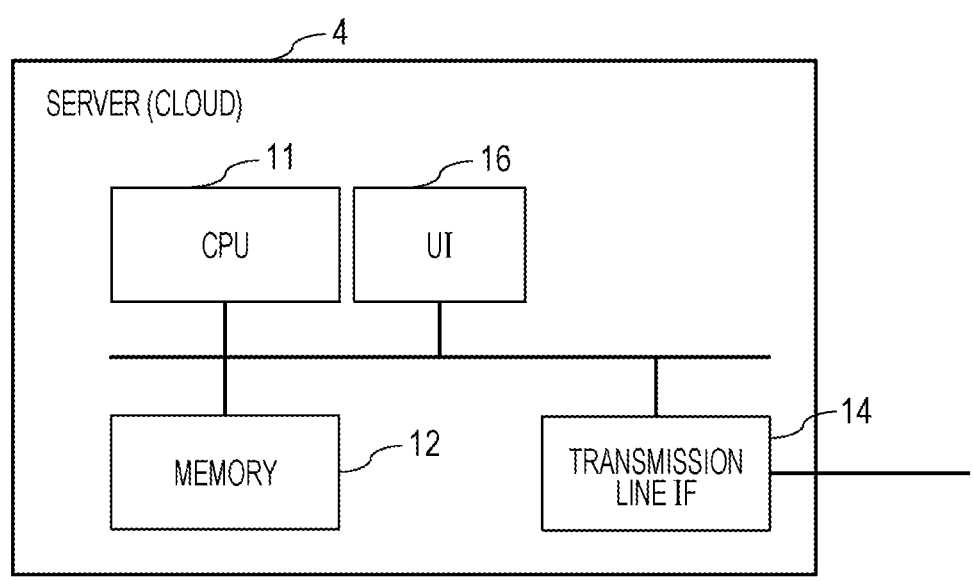
FIG. 6 is a diagram illustrating a hardware configuration example of a server (cloud server) on a cloud.
Figure 7:
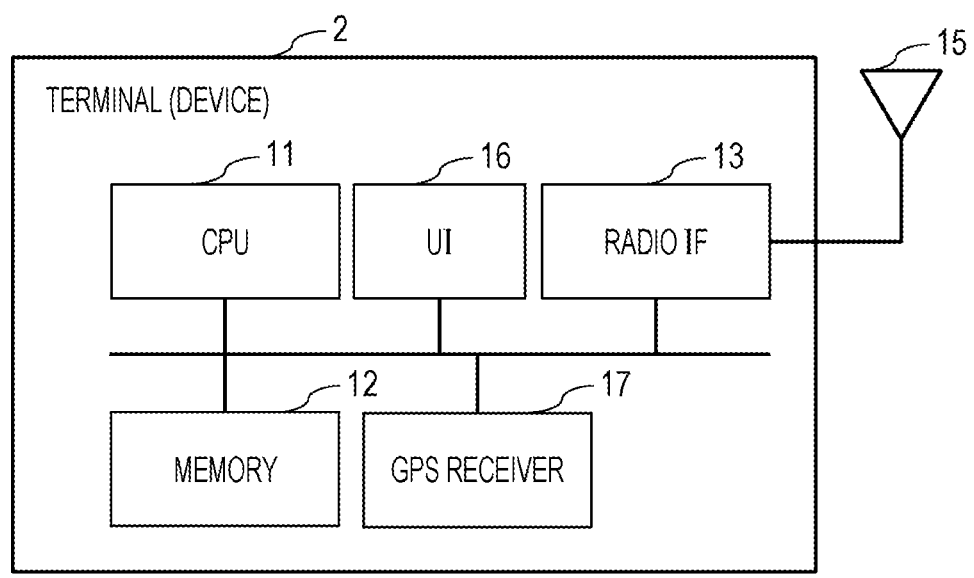
FIG. 7 is a diagram illustrating a hardware configuration example of a terminal (device)

FIG. 5 is a diagram illustrating a hardware configuration example of the edge server 3. FIG. 6 is a diagram illustrating a hardware configuration example of the server 4 on a cloud. FIG. 7 is a diagram illustrating a hardware configuration example of the terminal 2 (device).

In FIG. 5, the edge server 3 includes a Central Processing Unit (CPU) 11, a memory 12, a radio interface (radio IF) 13, a transmission line interface (transmission line IF) 14, and a user interface (UI) 16, which are mutually connected via a bus. An antenna 15 is connected to the radio IF 13.

The memory 12 includes a main storage and an auxiliary storage. The main storage is used as a developed area of a program, a work area of the CPU 11, and a memory area or a buffer area of data or a program. The main storage is formed, for example, by a combination of a Random Access Memory (RAM), or the RAM and a Read Only Memory (ROM).

The auxiliary storage is used as a memory area for data and a program. The auxiliary storage is formed, for example, by a hard disk drive (HDD), a Solid State Drive (SSD), and a nonvolatile storage medium such as a flash memory or an Electrically Erasable Programmable Read-Only Memory (EEPROM). The auxiliary storage may include a recording medium having a portability, such as a disk-type storage medium or a USB memory. The memory 12 (each of the main storage and the auxiliary storage) is an example of a "storage device", a "storage medium", a "memory", or a "memory section".

The radio IF 13 includes a base band circuit (BB circuit), and a Radio Frequency (RF) circuit. The BB circuit performs conversion processing between data (digital) signals and base band signals (BB signals). The RF circuit performs conversion processing between BB signals and radio signals. The radio signals are transmitted and received through the antenna 15.

The transmission line IF 14 is connected to an external network via a transmission line (for example, a wired LAN). For example, a LAN card (network interface card) may be applied as the transmission line IF 14.

The UI 16 includes an input device and an output device. The input device is used for inputting data or information. The input device is, for example, a key, a button, a pointing device (such as a mouse), a touch panel, or a microphone. The output device is used for outputting information. The output device is a display, a speaker, a lamp, and others.

The CPU 11 loads a program stored in the memory 12, and executes the program. The CPU 11 executes the program to cause various processing and operations as the edge server 3 to be performed. The CPU 11 is an example of a "control apparatus", a "control unit", a "controller", and a "processor".

The CPU is also called a microprocessor (MPU) or a processor. The CPU is not limited to a single processor, but may be a configuration of multi-processors. Moreover, a single CPU that is connected with a single socket may have a multi-core configuration. At least a part of the processing performed by the CPU may be performed by a dedicated processor other than the processor, for example, a Digital Signal Processor (DSP), a Graphics Processing Unit (GPU), a numerical processor, a vector processor, or an image processing processor.

Moreover, at least a part of the processing performed by the CPU may be performed by an integrated circuit (IC), or other digital circuits. Moreover, the integrated circuit or the digital circuit may include an analog circuit. The integrated circuit includes a LSI, an application specific integrated circuit (ASIC), and a programmable logic device (PLD). The PLD includes, for example, a field-programmable gate array (FPGA). At least a part of the processing performed by the CPU 11 may be executed in a combination of the processor and the integrated circuit. The combination is called, for example, a micro controller (MCU), SoC (System-on-a-chip), a system LSI, or a chip set.

As illustrated in FIG. 6, the server 4 on the cloud has a configuration the same as that of the edge server 3 except that the radio IF and the antenna are excluded from the configuration of the edge server 3, thus, redundant explanations are omitted. The terminal 2 exemplified in FIG. 7 has a configuration in which the transmission line IF is excluded from the configuration of the edge server 3. Note that, the terminal 2 may have a transmission line IF, and may be connected to a transmission line (such as a wired LAN). Moreover, the terminal 2 includes a global positioning system (GPS) receiver 17 that is used for measurement of the terminal 2.

Figure 8:
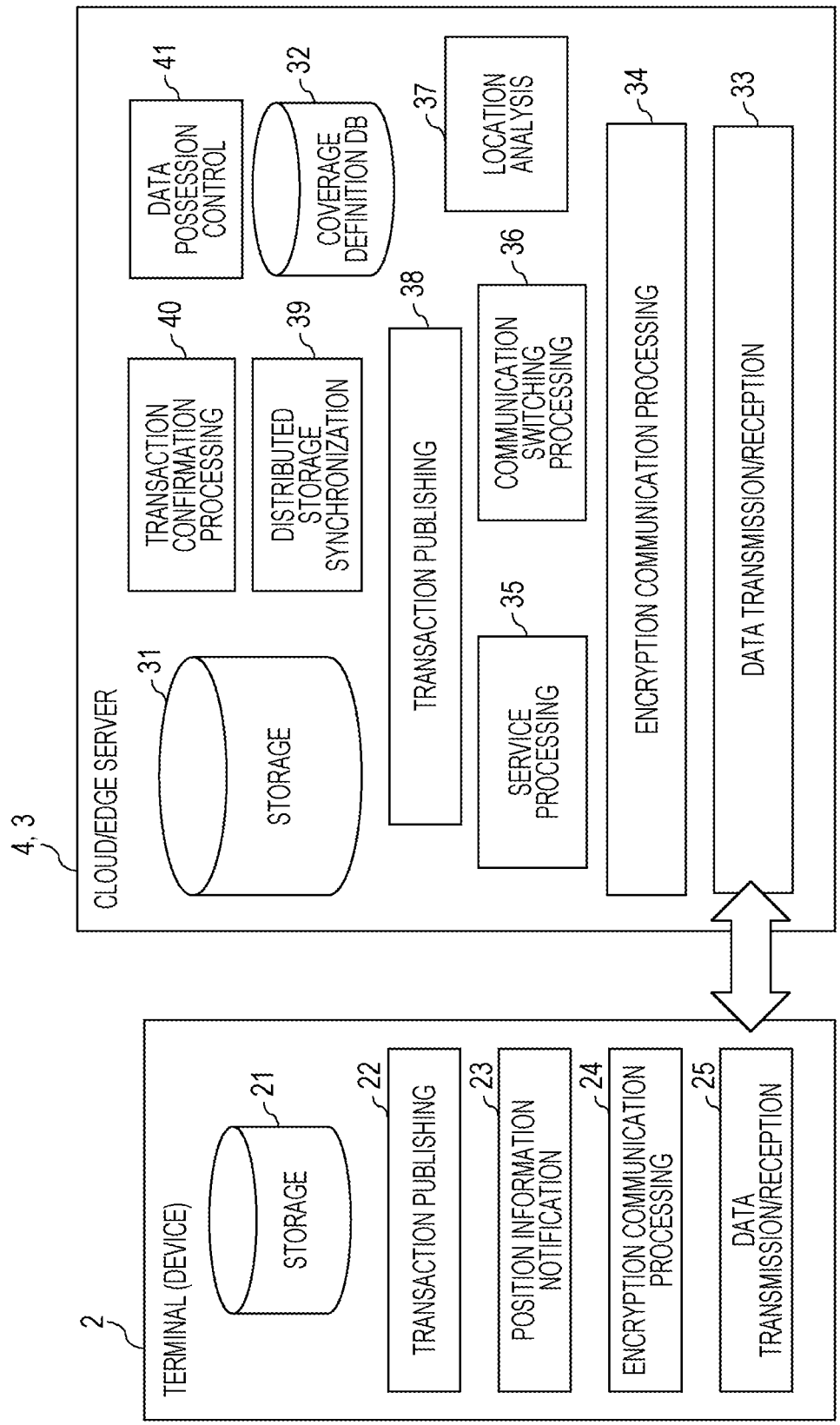
FIG. 8 schematically illustrates functions included in the terminal, the edge server, and the server.

FIG. 8 schematically illustrates functions included in the terminal 2, the edge server 3, and the server 4. In FIG. 8, the terminal 2 includes a storage 21, and operates as a device that performs transaction publishing 22, position information notification 23 of the terminal 2, encryption communication processing 24, and data transmission/reception 25. The memory 12 illustrated in FIG. 7 functions as the storage 21. The CPU 11 executes a program to perform each processing of the transaction publishing 22, the position information notification 23, and the encryption communication processing 24. The data transmission/reception 25 is performed using the radio IF 13 and the antenna 15.

Moreover, in FIG. 8, each of the edge server 3 and the server 4 includes a storage 31 and a coverage definition database (DB) 32, which are formed using the memory 12. Moreover, each of the edge server 3 and the server 4 performs data transmission/reception 33 using the radio IF 13 and the antenna 15, or the transmission line IF 14. Moreover, each of the edge server 3 and the server 4 performs encryption communication processing 34, service processing 35, communication switching processing 36, location analysis 37, and transaction publishing 38, due to the program execution by the CPU 11. In addition, each of the edge server 3 and the server 4 performs distributed storage synchronization 39, transaction confirmation processing 40, and data possession control 41, due to the program execution by the CPU 11.

The terminal 2 (device) illustrated in FIG. 3 has the mobility or the portability, so that the terminal 2 is moved to change a position thereof. The movement of the terminal 2 generates switching (change of an edge server 3 of connection destination) of the communication connection with the edge server 3 (GW). A long movement distance of the terminal 2 may cause frequent switching of the communication connection. In this process, an encryption key (for example, common key) is generated for every switching of the connection destination to result in the long time that is requested for the switching of the edge server 3, which may affect the preferred service provision. In the embodiment, an edge computing system that may shorten a period of time before the encryption communication with the terminal 2 having requested the connection is started will be described.

In the embodiment, information (encryption key information) on a communication key of the SSL/TLS having been generated based on the past connection between the terminal 2 and the edge server 3 or the server 4, on a blockchain (BC), which is an example of a distributed storage. The encryption key information may be shared among the terminal 2 (device), the edge server 3 (GW), and the server 4 (service provider).

The session information shared on the BC is used to omit a key exchange procedure (generation of an encryption key) when the terminal 2 is connected to a different edge server 3 along with the movement thereof (change of the connection destination). The omission of the key exchange procedure results in shortening of a period of time requested for switching (change), thereby providing rapid and preferred service.

Note that, in the embodiment, an example in which the BC is used as a management form of information to be shared will be described. Meanwhile, the retention form of information to be shared is not limited to the BC. For example, information to be shared may be retained by a distributed storage mechanism in which information is distributed and stored using multiple storages. In the embodiment, as an example, an example in which a distributed storage is constructed on a cloud, and copies of a part or all of shared information that is stored in the distributed storage are stored in the terminal 2, the edge server 3, and the server 4 will be described. Meanwhile, the memory 12 included in each of the terminal 2, the edge server 3, and the server 4 may be a part of storages that forms the distributed storage.

In the embodiment, information on a transaction (message) that is published by each of the terminal 2 (device), the edge server 3 (GW), and the server 4 (cloud) is held in the distributed storage. Alternatively, transaction information may be broadcasted and stored in the distributed storage, and may be stored in the memories 12 of the terminal 2, the edge server 3, and the server 4 as well. The "transaction" that is published each of the terminal 2 (device), the edge server 3 (GW), and the server 4 (cloud) is an example of a message.

Transaction information related to each of the terminal 2, the edge server 3, and the server 4 may preferably be stored in advance or may be downloaded from the distributed storage, in each memory 12.

In the embodiment, a first distributed storage and a second distributed storage are constructed. The first distributed storage is constructed so as to share transaction information between the edge server 3 (GW) and the server 4 (cloud server: service provider). Transaction information that is stored in the first distributed storage includes information set before service provision to the terminal 2 (device: user) is started.

The second distributed storage is constructed so as to share transaction information among the terminal 2 (device), the edge server 3 (GW), and the server 4 (service provider). Information stored in the second distributed storage includes information related to a communication procedure in the operation of service and information used for grasping a history of the service utilization. The information related to a communication procedure includes the abovementioned session information (such as encryption key information) of the SSL/TLS.

Figure 9:
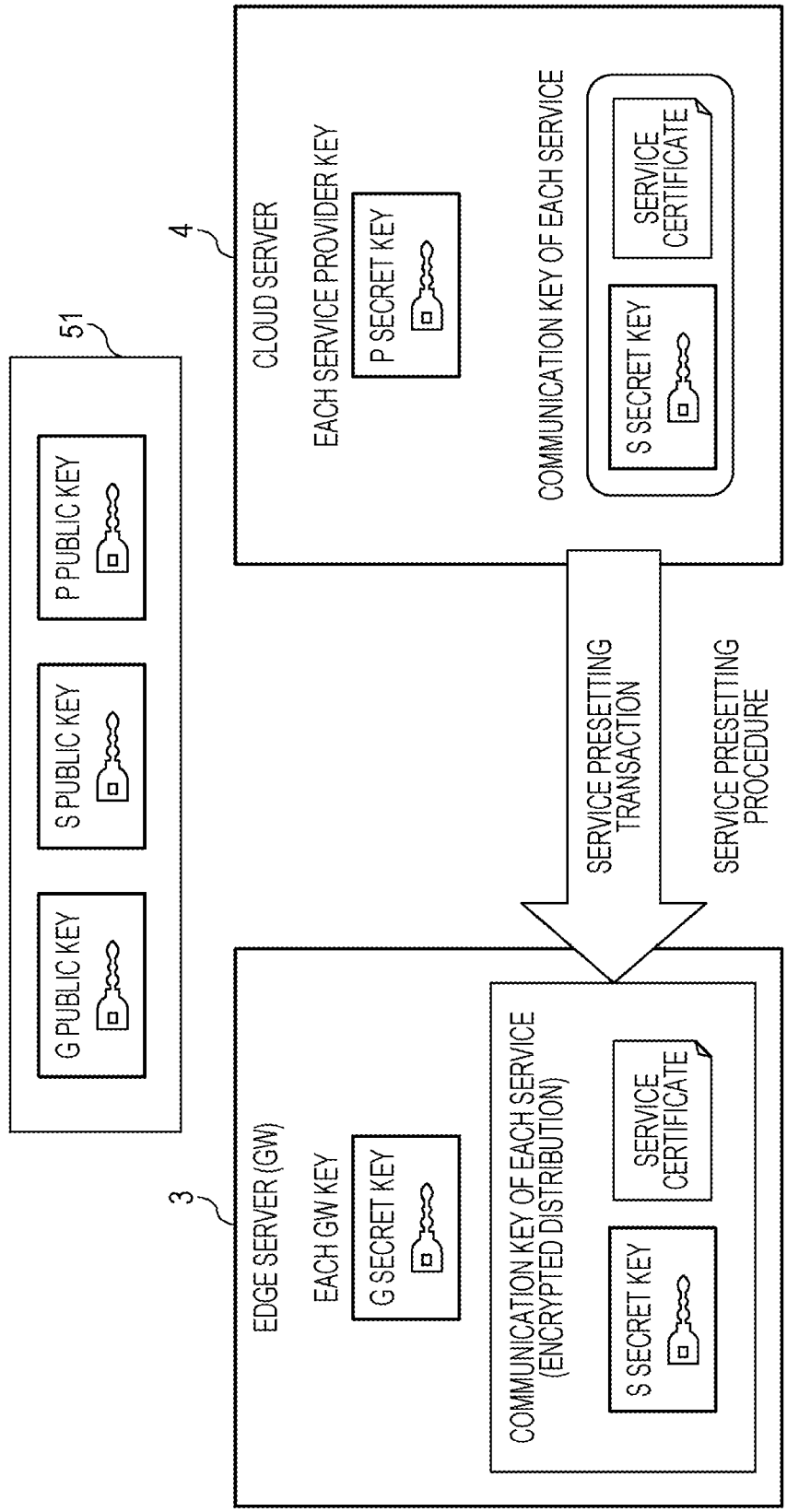
FIG. 9 is an explanation diagram of a first distributed storage.

FIG. 9 is an explanation diagram of the first distributed storage. In FIG. 9, a first distributed storage 51 is constructed so as to make public and manage a public key (G public key) of the edge server 3 that is utilized in the presetting of service, a public key (P public key) of the service provider, and a public key (S public key) of the service.

The copy of information stored in the first distributed storage 51 is stored in the memory 12 (the storage 31) of each of the edge server 3 and the server 4 (cloud server). The edge server 3 publishes a G secret key and a G public key, and the service provider (server 4) publishes a P secret key and a P public key, and an S secret key and an S public key of each service.

Each edge server 3 stores the G secret key of the edge server 3 in the memory 12, and the server 4 (cloud server) stores the P secret key of each service provider in the memory 12. The S secret key and a service certificate of each service are encrypted and distributed from the server 4 to each edge server 3.

Figure 10:
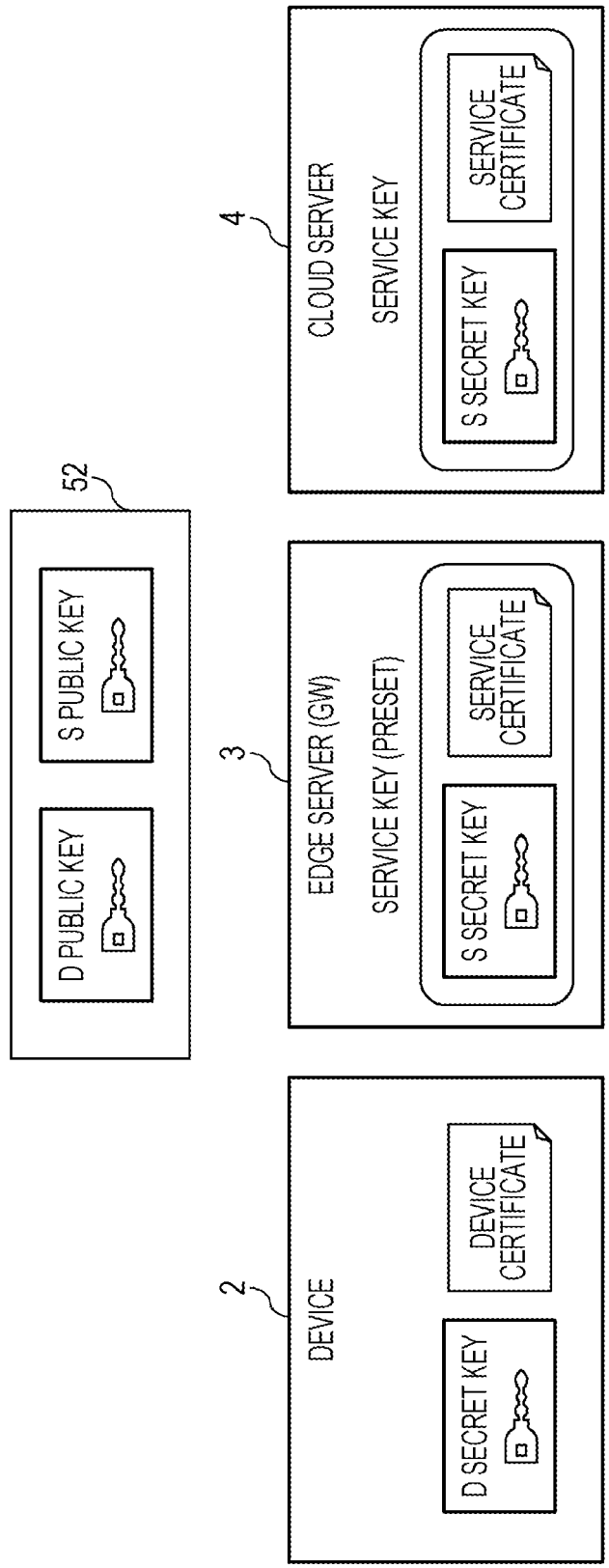
FIG. 10 is an explanation diagram of a second distributed storage.

FIG. 10 is an explanation diagram of the second distributed storage. In FIG. 10, a second distributed storage 52 is used when service is operated. The second distributed storage 52 makes public and manages the public key (S public key) of the service and a public key (D public key) of the terminal 2 (device). The copy of the storage content of the second distributed storage is stored in the memory 12 of each of the terminal 2 (device), the edge server 3, and the server 4 (cloud server), and may be browsed in the terminal 2 (device), the edge server 3, and the server 4 (cloud server).

Operation Example when Service is Set Beforehand

Figure 11:
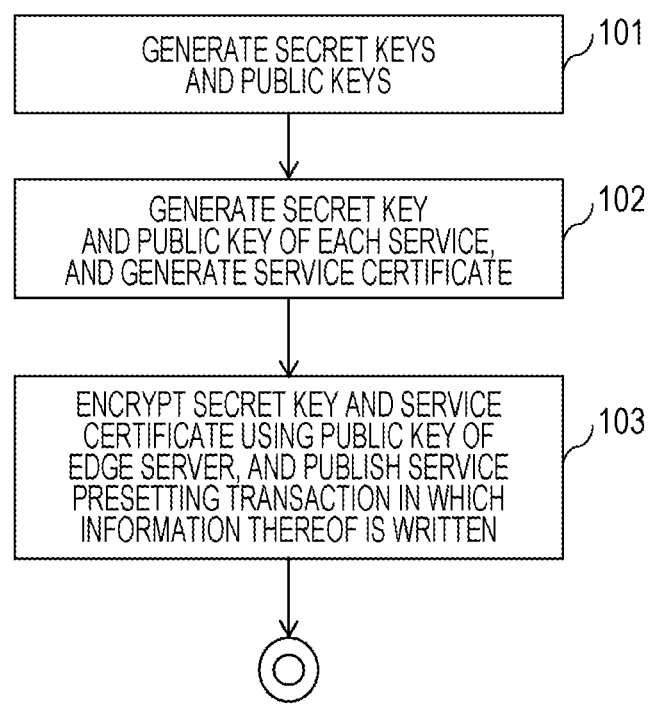
FIG. 11 is an explanation diagram of an operation example of the edge server and the server in the setting of a service before the operation of the service is started (before operation)

FIG. 11 is an explanation diagram of an operation example of the edge server 3 and the server 4 in the setting of service before the operation of the service is started (beforehand).

Dedicated application programs are respectively installed in the memories 12 of information processing apparatuses (computers) that are respectively operated as the edge server 3 and the server 4 according to the embodiment.

(Process at 101)

At 101 in FIG. 11, the CPU 11 of each of the edge server 3 and the server 4 generates a public key and a secret key by executing a dedicated application. In this process, a G secret key and a G public key are generated in the edge server 3, whereas a P secret key and a P public key are generated in the server 4. The G secret key is concealed and managed in the edge server 3, and the P secret key is concealed and managed in the server 4.

The edge server 3 (GW) publishes a transaction (a message of a transmission source: the GW and a destination: the service provider) related to the G public key being made public, and allows the G public key to be made public on the first distributed storage 51. The server 4 (service provider) publishes a transaction (a message of a transmission source: the service provider and a destination: the GW) related to the P public key being made public, and allows the P public key to be made public on the first distributed storage 51. The G secret key and the G public key may be communication keys unique to each edge server 3, or may be communication keys common to among multiple edge servers 3.

(Process at 102)

At 102 in FIG. 11, the CPU 11 of the server 4 generates a secret key and a public key (S secret key and S public key) of each service that the server 4 provides as a service provider, and generates a service certificate thereof. The server 4 makes public the S public key of each service on the first distributed storage 51. The CPU 11 of the server 4 (service provider) holds a certificate of the certificate authority (CA: Certification Authority) in advance in the memory 12, and generates and manages a service certificate with the signature by the certificate authority for every service.

(Process at 103)

The S secret key is used to a signature when the SSL/TLS communication is performed and when a service processing transaction (an example of a service processing message) in each edge server 3 is published. The service certificate generated at 102 is utilized for service authentication when the SSL/TLS communication is performed.

At 103, the server 4 (service provider) encrypts the S secret key and the service certificate that the server 4 includes, using a G public key (acquired from the first distributed storage 51) of the edge server that a distribution and share destination. The server 4 embeds the S secret key and the service certificate into a service presetting transaction (message of service presetting) including transmission source information designated by the P public key, signature information using the P secret key, and destination information designated by the G public key of each edge server 3, and registers the service presetting transaction in the first distributed storage 51. With this registration, the S secret key and the service certificate are distributed to the edge server 3 (see FIG. 9). This enables the edge server 3, instead of the server 4, to publish a transaction including the signature using the S secret key.

Figure 12:
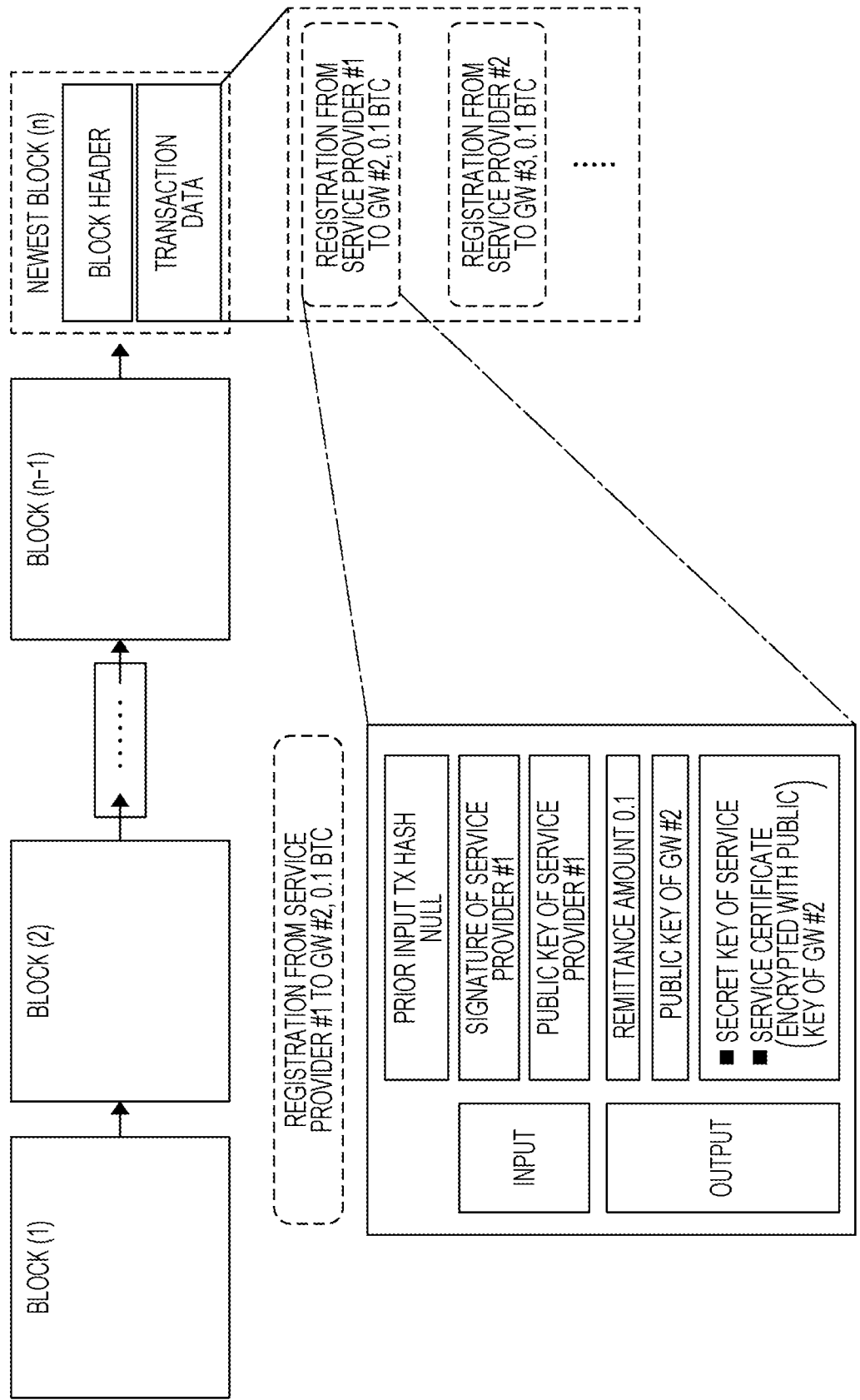
FIG. 12 illustrates a data structure example of a service presetting transaction.

FIG. 12 illustrates a data structure example of the service presetting transaction. The transaction is, for example, registration from a server 4 (service provider #1) to an edge server 3 (GW #2), and the remittance of 0.1 BTC.

In this case, a hash value of a prior transaction is set to NULL. As input (transmission source) information, a signature of the service provider #1 and a public key (G public key) of the service provider #1 are set.

Moreover, as output (destination) information, the remittance amount 0.1 (BTC), a public key (G public key) of the GW #2, and an S secret key and a service certificate that are encrypted with the public key of the GW #2. The S secret key and the service certificate (with the signature by the certificate authority) that are encrypted with the public key of the GW #2 are written within a format (for example, option area) of the transaction.

The service presetting transaction is treated as an unapproved transaction, and serves as a part of transaction data in the mining (new block generating processing) by Miners, as illustrated in FIG. 11. The mining may be executed in the server 4 or the edge server 3. Alternatively, a person in charge of the information registered in the first distributed storage 51 may execute the mining.

Note that, in the example illustrated in FIG. 12, although the transaction information includes the remittance of the virtual currency (such as bitcoin), information related to the remittance of the virtual currency is not significantly requested to be included in the service presetting transaction.

The processing illustrated in FIG. 11 enables the edge server 3 to securely possess the S secret key and the service certificate of each service, using the G secret key corresponding to the edge server 3.

Operation Example in Operation of Service

Figure 13:
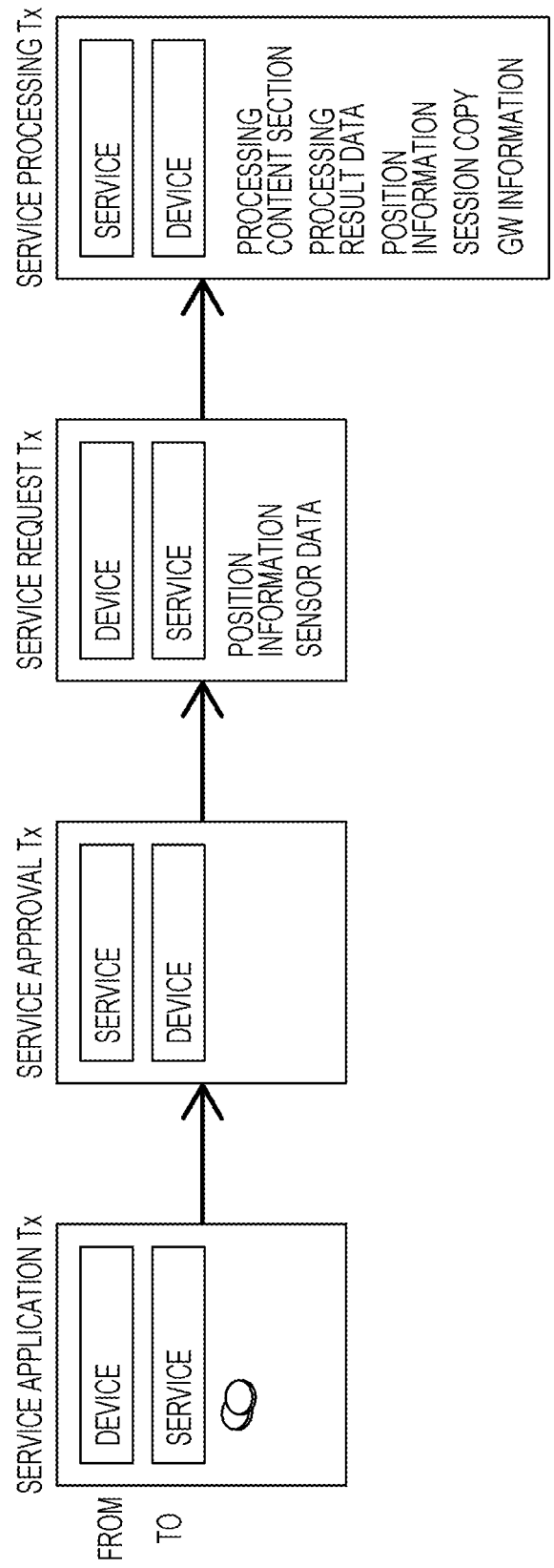
FIG. 13 is an explanation diagram of a transaction published in the operation of the service.

FIG. 13 is an explanation diagram of a transaction published in the operation of the service. The second distributed storage 52 stores and manages four types of transactions (messages), as illustrated in FIG. 13. Specifically, the second distributed storage 52 stores and manages a service application transaction, a service approval transaction, a service request transaction, and a service processing transaction. The service application transaction is an example of a service application message, the service approval transaction is an example of a service approval message, the service request transaction is an example of a service request message, and the service processing transaction is an example of a service processing message.

Figure 14:
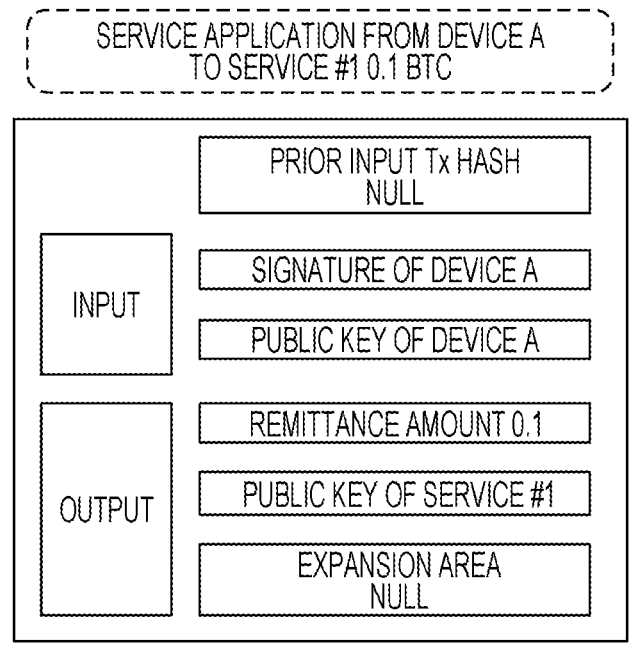
FIG. 14 illustrates a data structure example of a service application transaction (service application Tx)

FIG. 14 illustrates a data structure example of a service application transaction (service application Tx). The service application transaction is published by the terminal 2 (device) that desires a service provision.

FIG. 14 exemplifies a service application transaction from a given terminal 2 (device A) to given service (service #1). The transmission source of the service application transaction is the public key (D public key) of the terminal 2, and the destination thereof is the S public key. In other words, the terminal 2 is designated as the transmission source, and the service is designated as the destination.

The hash value of a prior transaction (prior input Tx hash) is NULL. An electronic signature of the device A and a public key (D public key) of the device A are set as the input (transmission source). The electronic signature of the device A is generated by encryption of the public key of the device A with the hash value being NULL. The remittance amount 0.1 BTC (service usage fee) and a public key (S public key) of the service #1 are set as the output (destination). Moreover, NULL set is set to written information in the format.

Figure 15:
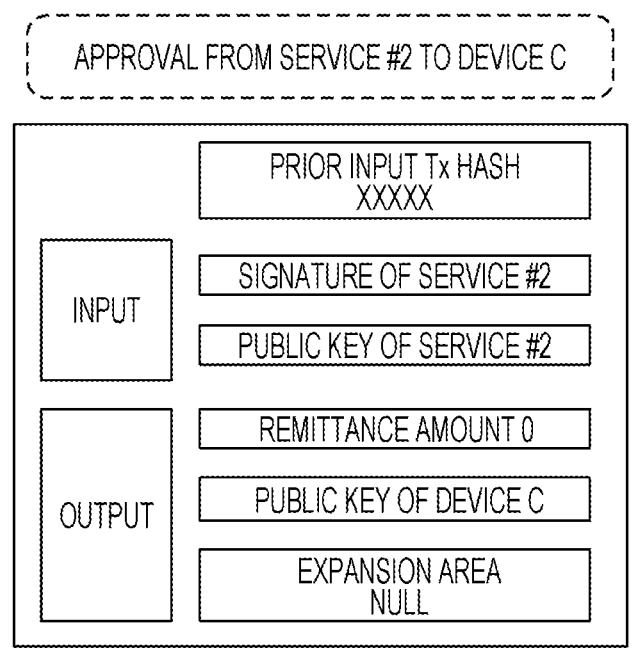
FIG. 15 illustrates a data structure example of a service approval transaction (service approval Tx)

FIG. 15 illustrates a data structure example of a service approval transaction (service approval Tx: a message of service approval). The service approval transaction is published by the edge server 3 or the service provider (server 4) that approves the application from the terminal 2 (device).

FIG. 15 exemplifies a service approval transaction from given service (service #2) to a given terminal 2 (device C). The transmission source of the service approval transaction is the service #2, and the destination thereof is the terminal 2 (device C).

The information "XXXX" of the corresponding service application transaction is used as a hash value of the prior transaction (prior input Tx hash) in the service approval transaction. A signature of the service #2 using the S secret key and a public key (S public key) of the service #2 are set as the input (transmission source). The remittance amount 0 and a public key (D public key) of the device C are set as the output (destination). Moreover, NULL is set to written information in the format.

Figure 16:
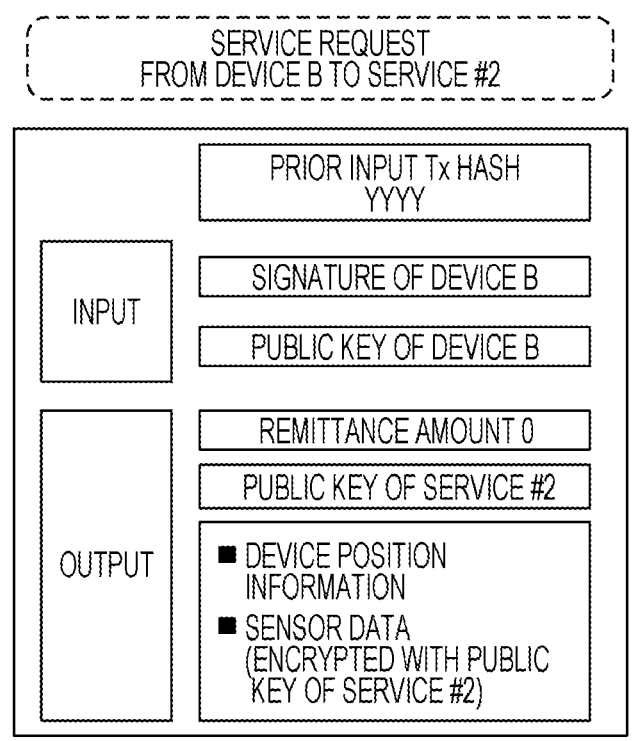
FIG. 16 illustrates a data structure example of a service request transaction (service request Tx)

FIG. 16 illustrates a data structure example of a service request transaction (service request Tx). The service request transaction is published by the terminal 2 (device) that desires processing related to the service.

FIG. 16 exemplifies a service request transaction from a given terminal 2 (device B) to given service (service #2). The transmission source of the service request transaction is the terminal 2 (device), and the destination thereof is the service.

The corresponding confirmed service approval transaction information "YYYY" is used as a hash value of the prior transaction (prior input Tx hash). A signature of the device B and a public key (D public key) of the device B are set as the input (transmission source). The remittance amount 0 and a public key (S public key) of the service #2 are set as the output (destination). Moreover, position information and sensor data of the terminal 2 (device) that are encrypted with the S public key are set in written information in the format.

The position information is acquired using a GPS receiver 17 included in the terminal 2, for example. Note that, the position information may be detected or measured by equipment other than the terminal 2. The sensor data is sensing data by a sensor that the terminal 2 is provided with. The sensor data is an example of data (data to be processed for accumulation or computation (referred to as app data)) that is used for the service processing. The app data is not limited to sensor data. The app data is an example of "data to be processed in the service".

Figure 17:
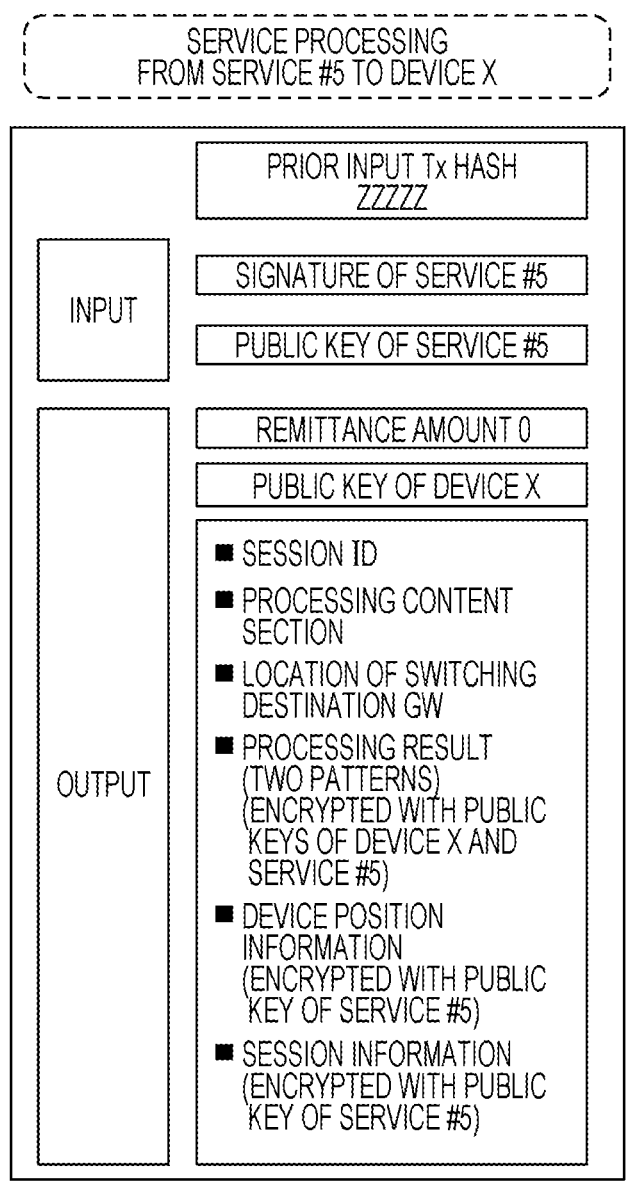
FIG. 17 illustrates a data structure example of a service processing transaction (service processing Tx)

FIG. 17 illustrates a data structure example of a service processing transaction (service processing Tx). The service processing transaction is published by the service provider (server 4) that executes processing related to the service.

FIG. 17 exemplifies a service processing transaction from a given service (service #5) to a given terminal 2 (device X). The transmission source of the service processing transaction is the service, and the destination thereof is the terminal 2 (device).

The corresponding confirmed service application transaction information or the service processing request transaction information are used as a hash value of the prior transaction (prior input Tx hash). A signature of the service #5 and a public key (S public key) of the service #5 are set as the input (transmission source). The remittance amount 0 and a public key (D public key) of the device X are set as the output (destination). Moreover, written information in the format includes a session ID, a processing content section (service processing, connection switching processing), a connection destination (for example, a location (processing execution location) of the switching destination GW), and a processing result, which are encrypted with the public key of the service #5. Moreover, the written information in the format includes a session ID, a processing content section, a processing location, and a processing result, which are encrypted with the public key of the device X. The written information in the format further includes device position information, which is encrypted with the public key of the service #5, and session information, which is encrypted with the public key of the service #5.

Figure 18:
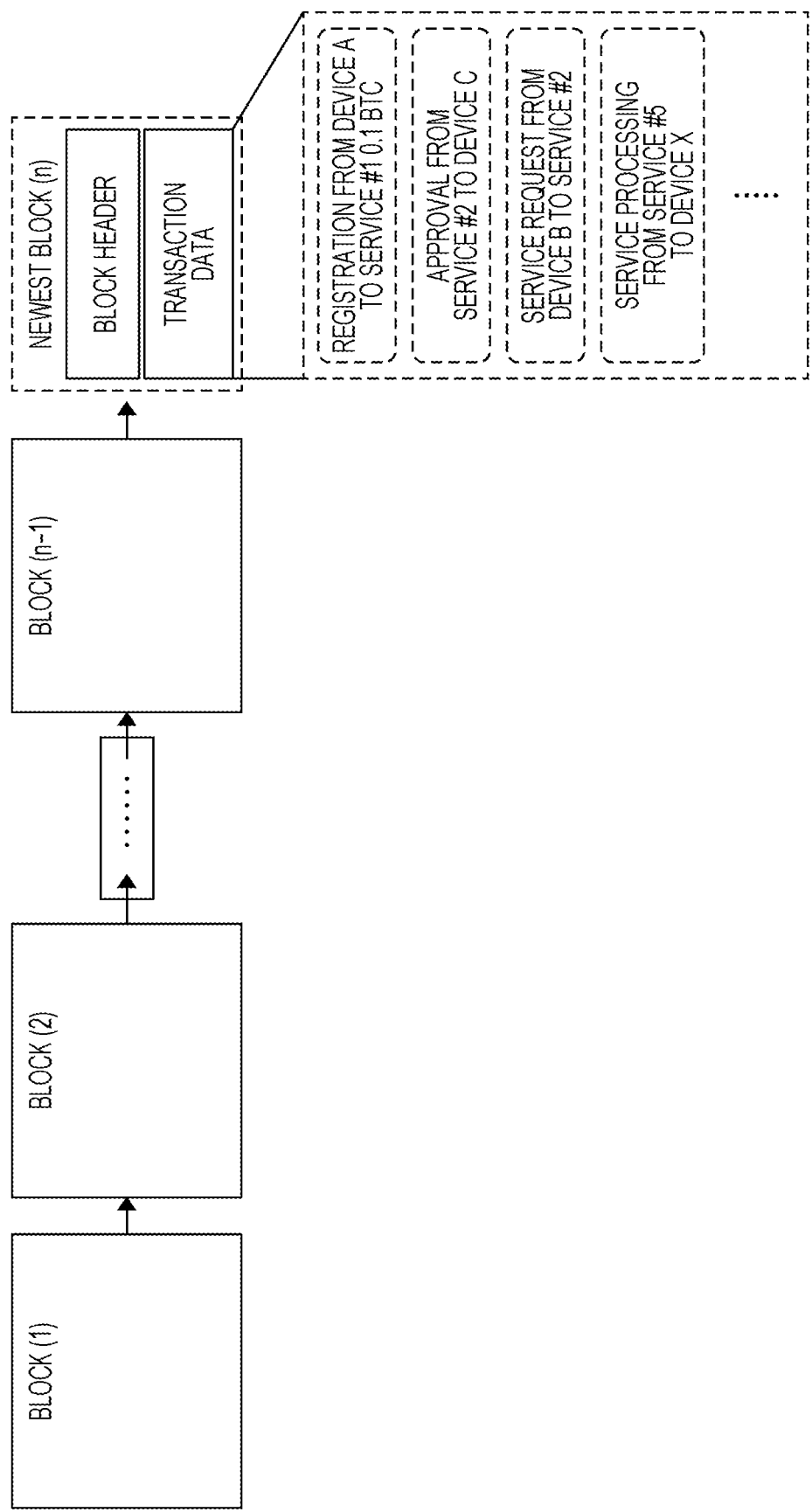
FIG. 18 is a diagram schematically illustrating a relation between the service application transaction, the service approval transaction, the service request transaction and the service processing transaction, and the BC.

As illustrated in FIG. 18, the service application transaction, the service approval transaction, the service request transaction, and the service processing transaction, which are published within a predetermined period, are collected to one block that forms the BC by the Miner. The mining may be executed by the edge server 3 or the server 4, or may be executed by a person in charge of the second distributed storage.

<Service Application (Service Registration) Procedure of Device>

Figure 19:
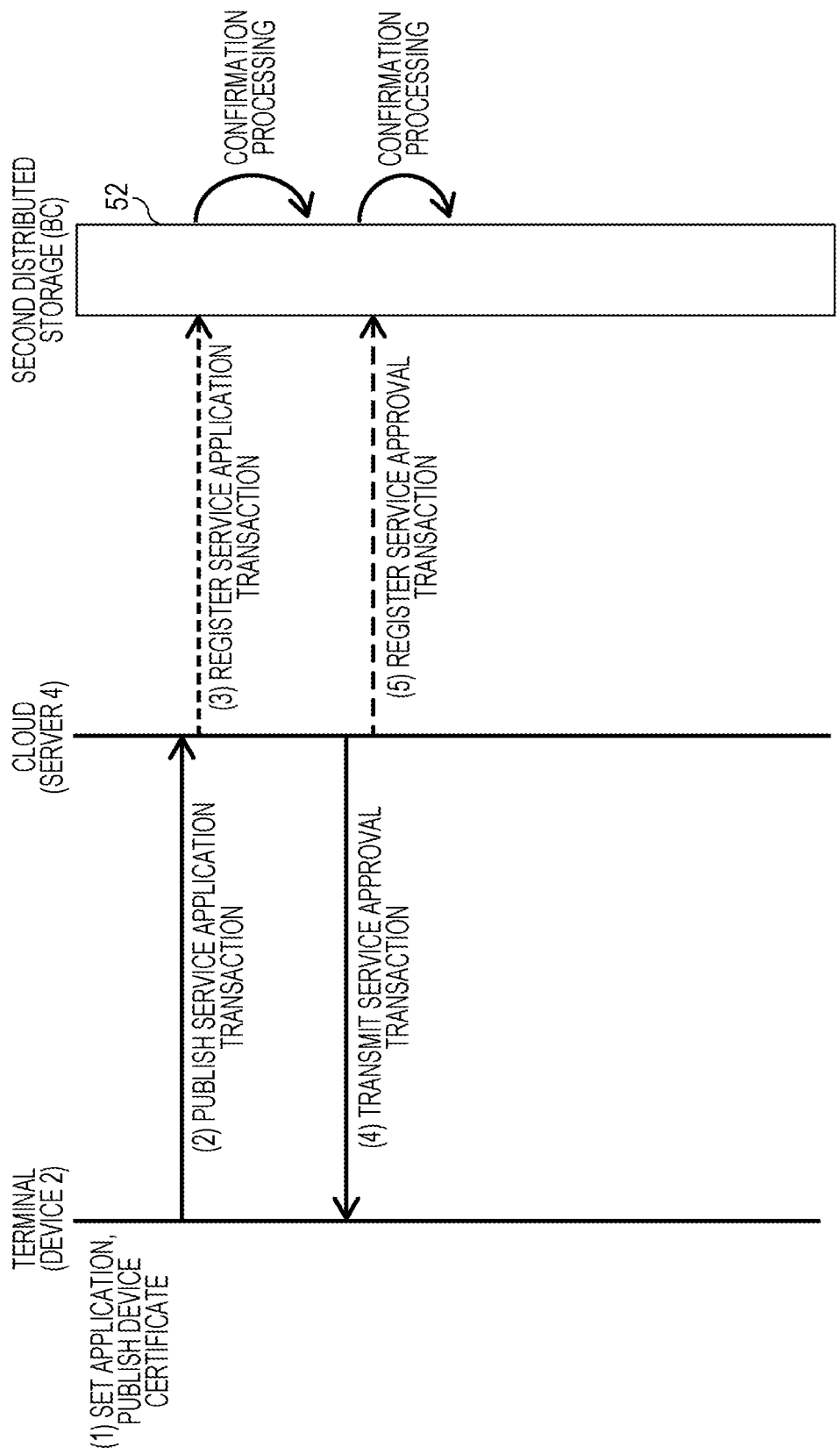
FIG. 19 is a sequence diagram illustrating a registration procedure of the terminal (device)
Figure 20:
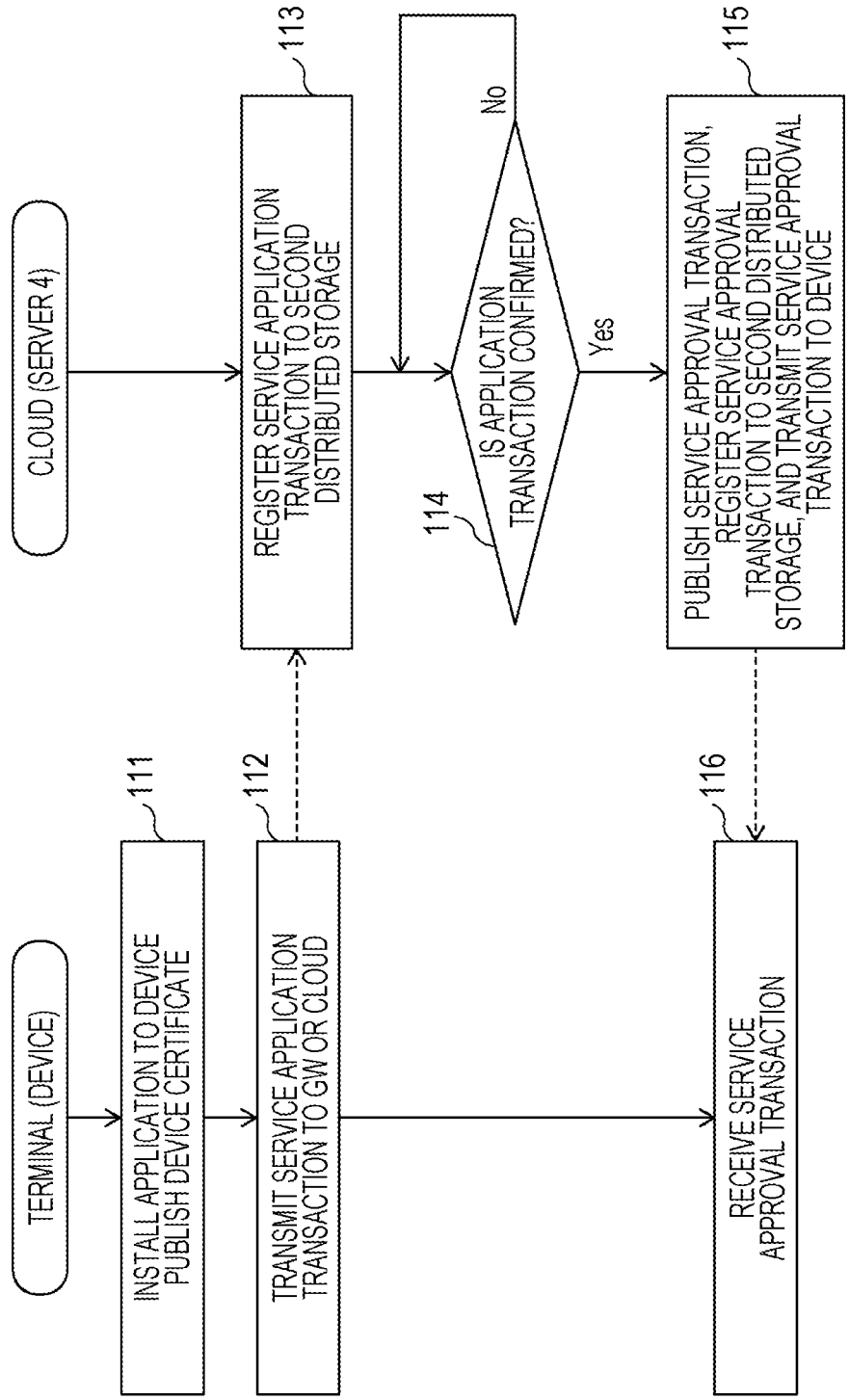
FIG. 20 is a flowchart illustrating a processing example of the terminal and the server related to the registration procedure.

FIG. 19 is a sequence diagram illustrating a registration procedure of the terminal 2 (device), and FIG. 20 is a flowchart illustrating a processing example related to the registration procedure of the terminal 2 and the server 4.

<Processing of (1) in FIG. 19>

A dedicated application program is installed in the memory 12 of the terminal 2 (device). The CPU 11 of the terminal 2 executes the installed application program to generate a secret key and a public key (D secret key/D public key). The D secret key is concealed and managed in the terminal 2 (device). The terminal 2 makes public the D public key as information on the transmission source and the destination of a transaction on the second distributed storage 52. The terminal 2 (device) acquires a public key (S public key) of each service that is desired for provision and utilization from the second distributed storage 52. In addition, the terminal 2 (device) holds in advance the electron certificate by the certificate authority (CA) in the memory 12, and generates a device certificate with the signature by the certificate authority (at 111 in FIG. 20).

<Processing of (2) in FIG. 19>

The CPU 11 of the terminal 2 (device) generates a service application transaction (FIG. 14) of the service to be desired for utilization, and transmits the service application transaction to the cloud (server 4) or the edge server 3 (GW) (at 112 in FIG. 20). In the example of FIG. 19 and FIG. 20, the service application transaction is transmitted to the cloud (server 4).

<Processing of (3) in FIG. 19>

The CPU 11 of the server 4 registers the service application transaction to the second distributed storage 52 (BC) (at 113 in FIG. 20). The service application transaction is confirmed by mining (confirmation processing of the block). A service provider corresponding to a target service of a service processing transaction may decide the charge for a user of the device, at this trigger.

<Processing of (4) and (5) in FIG. 19>

If the confirmation processing of the service application transaction is finished (Yes at 114 in FIG. 20), the CPU 11 of the server 4 publishes a service approval transaction, and registers the service approval transaction to the second distributed storage 52. Moreover, the CPU 11 transmits the service approval transaction to the terminal 2 (device) ((4) in FIG. 19, at 115 in FIG. 20).

The service approval transaction includes information (hash value of prior transaction (input Tx)) on the corresponding service application transaction. The terminal 2 (device) receives and holds the service approval transaction (at 116 in FIG. 20).

Operation Example 1: Service Request and Service Processing Procedures (Case where Device is Authenticated at Application Side)

Figure 21:
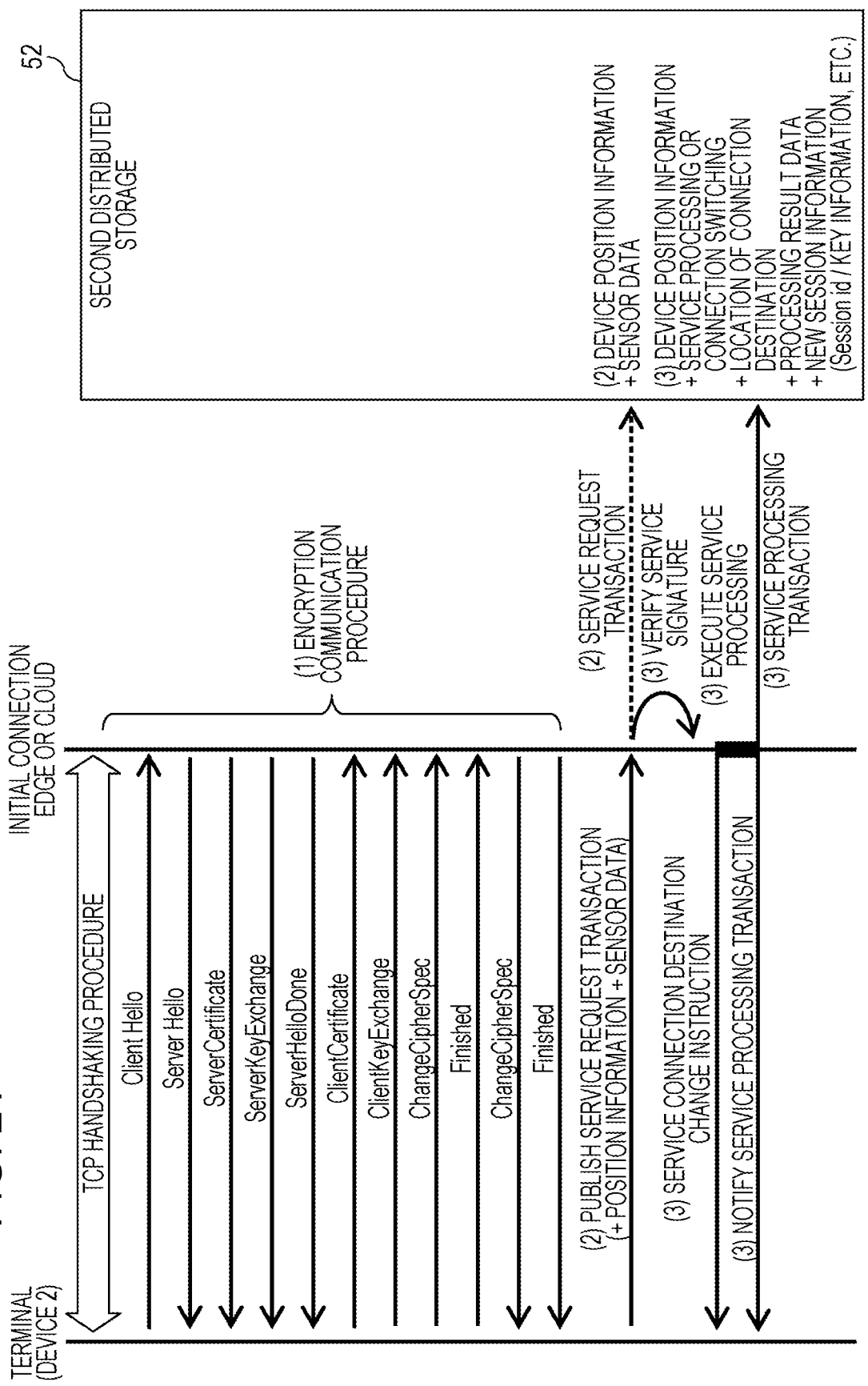
FIG. 21 is a sequence diagram illustrating an operation example related to the service request transaction and the service processing transaction.
Figure 22:
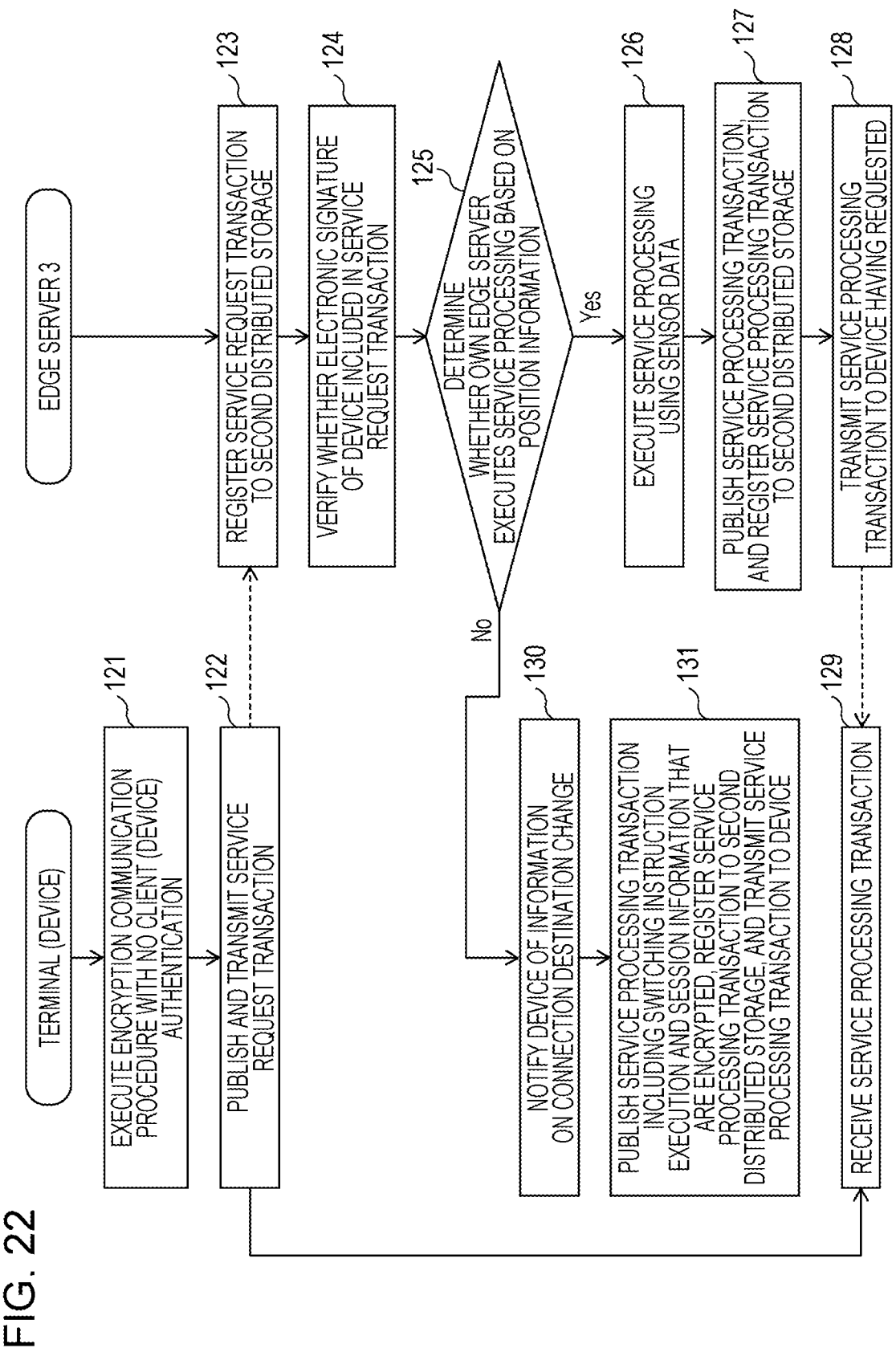
FIG. 22 is a flowchart illustrating a processing example related to the service request transaction and the service processing transaction.
Figure 23:
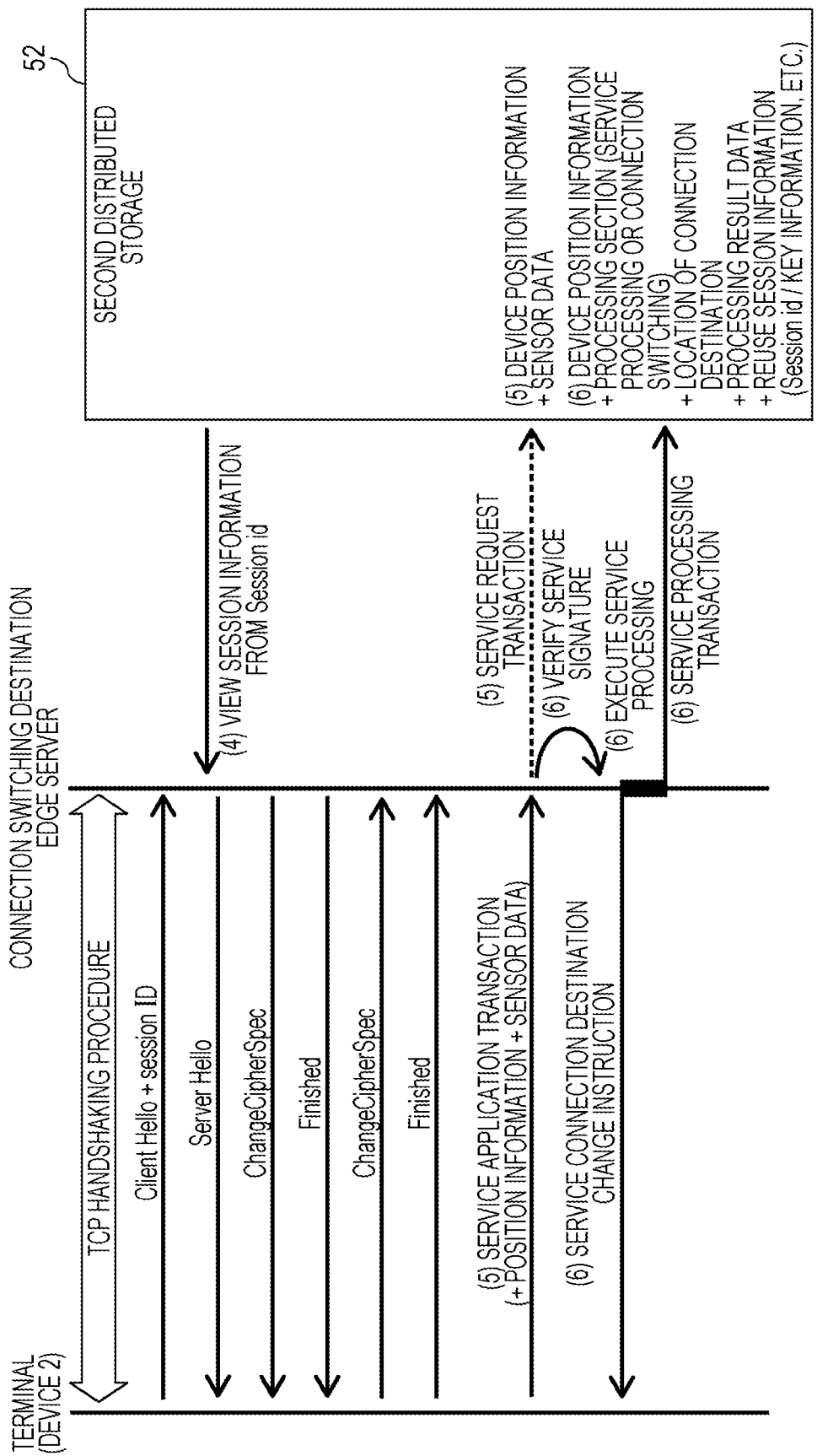
FIG. 23 is a sequence diagram illustrating an operation example related to the service request transaction and the service processing transaction.
Figure 24:
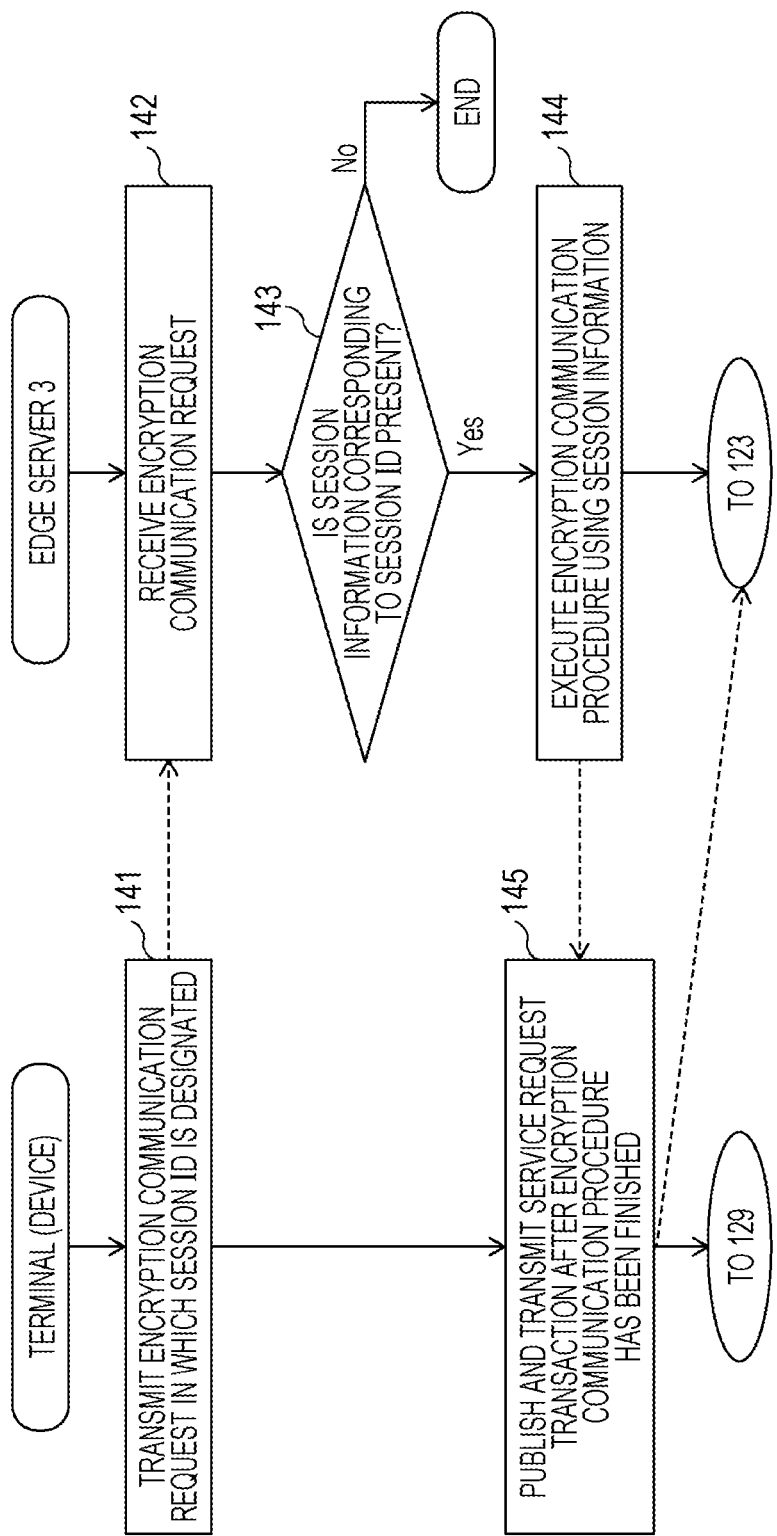
FIG. 24 is a flowchart illustrating a processing example related to the service request transaction and the service processing transaction.

FIG. 21 and FIG. 23 are sequence diagrams illustrating an operation example related to a service request transaction and a service processing transaction. FIG. 22 and FIG. 24 are flowcharts illustrating a processing example related to the service request transaction and the service processing transaction. The processing in FIG. 22 and FIG. 23 is executed by the respective CPUs 11 of the terminal 2 and the edge server 3.

<<Processing of (1) in FIG. 21: Encryption Communication Procedure>>

In (1) in FIG. 21, the terminal 2 (device) that desires communication executes an encryption communication procedure (negotiation based on the SSL/TLS) with no client authentication, to the connection destination GW (edge server 3) or the cloud (server 4), which are set for initial connection (at 121 in FIG. 22). The encryption communication procedure in (1) in FIG. 21 is the same as the procedure at the initial access illustrated in FIG. 2A, and thus explanations thereof are omitted.

<<Processing of (2) in FIG. 21: Service Request Transaction>>

The terminal 2 (device) publishes a service request transaction related to the service to be desired for utilization (FIG. 16). Information on the corresponding service approval transaction is set in the hash value of the prior transaction (prior input Tx hash) in the service request transaction. Moreover, position information and sensor data of the own terminal 2 that are encrypted with the public key (S public key) of the corresponding service are set in the written information in the format in the service request transaction.

The service request transaction is transmitted to the initial connection GW (edge server 3) or the cloud (server 4) (at 122 in FIG. 22). In the example of FIG. 21, the service request transaction is transmitted to the edge server 3 serving as the initial connection GW. The edge server 3 registers the service request transaction to the second distributed storage (at 123 in FIG. 22).

<<Processing of (3) in FIG. 21: Device Signature Verification, Service Processing>>

The edge server 3 verifies whether the electronic signature of the device included in the service request transaction (see FIG. 16) is valid (at 124 in FIG. 22). In other words, the edge server 3 decrypts the signature of the device set in the input in the service request transaction with the public key of the device similarly set in the input, and determines that the signature of the device is valid if a decryption result is equivalent to the hash value of the transaction before the device signature has been written. If it is determined that the signature of the device is valid, the edge server 3 decrypts encrypted data of written information in the format in the service request transaction with the S secret key in the service request transaction to obtain the position information and the sensor data. The edge server 3 determines whether the own edge server 3 executes processing corresponding to the service request based on the position information of the terminal 2 (device) (at 125 in FIG. 22).

For example, if another edge server 3 with a closer distance to the terminal 2 is not present, the edge server 3 determines that the own edge server 3 executes the service processing. In contrast, if another edge server 3 with a closer distance to the terminal 2 is present, the edge server 3 determines that the another edge server 3 has to perform the service processing, and decides that the connection destination of the terminal 2 is changed (switched) to the another edge server 3.

In the process at 125, if it is determined that the own edge server executes the service processing, the edge server 3 executes the service processing using the sensor data, for example (at 126 in FIG. 22). The edge server 3 publishes a service processing transaction (FIG. 17) in accordance with a result of the service processing, and registers the service processing transaction in the second distributed storage 52 (at 127 in FIG. 22).

The edge server 3 further transmits the service processing transaction the device (terminal 2) that is a publishing source of the service request transaction (at 128 in FIG. 22). The terminal 2 receives the service processing transaction (at 129 in FIG. 22).

On the other hand, in the process at 125, if it is determined that the another edge server 3 executes the service processing, the edge server 3 notifies the device (terminal 2) of information (service connection destination change instruction: including information on the another edge server 3) on connection destination switching (at 130 in FIG. 22). The edge server 3 further publishes a service processing transaction including connection switching information (processing content section: connection switching) and session information that are encrypted with the S secret key, registers the service processing transaction to the second distributed storage 52, and transmits the service processing transaction to the terminal 2 (device) (at 131 in FIG. 22).

The session information includes, for example, a version (version of the SSL/TLS) of a protocol, random number information (for example, premaster secret and random number) requested for encryption, a session ID, an encryption method, or a data compression method. Alternatively, the session information may include common key information itself for communication.

The service processing transaction includes data of the service processing result that is encrypted with the S public key for the service provider, and data of the service processing result that is encrypted with the D public key for reference by the device.

This enables the edge server 3 (GW) and the cloud (server 4) to share the encrypted session information. Moreover, a person in charge of information in the distributed storage verifies signature information included in the registered transactions, bundles the transactions, and collects the transactions to obtain information that is impossible to falsify, thereby periodically executing confirmation processing (mining). A service provider having the corresponded service may decide the charge for a user of the device, at this trigger.

<<Processing of (4) in FIG. 23: Encryption Communication Procedure>>

As illustrated in FIG. 23, in the second or subsequent connection, the terminal 2 (device) holds the session ID generated at the initial connection, and transmits an encryption communication request (Client Hello in the SSL/TLS) including the session ID, thereby designating the session ID.

When the edge server 3 as a connection destination is changed, the terminal 2 transmits Client Hello including the session ID, to another edge server 3 designated by a server connection destination change instruction. The session ID is an example included in designated information.

The edge server 3 (GW) having received Client Hello including designation of the session ID refers to the copy of the distributed storage stored in the local storage (the memory 12), and acquires corresponding session information in the service processing transaction. Utilizing the session information enables the edge server 3 to start encryption communication with the terminal 2, without renegotiation of exchange of keys.

When the terminal 2 designates no session ID or session information corresponding to the session ID is not present, the process same as that at the initial connection illustrated in (1) in FIG. 21 is executed. When the terminal 2 (device) intends to newly update the session information, the terminal 2 may designate no session ID.

<<Processing of (5) and (6) in FIG. 23>>

The processing of (5) and (6) in FIG. 23 is the same as the processing of (2) and (3) in FIG. 21, and thus explanations thereof are omitted.

FIG. 24 is a flowchart illustrating a processing example of the terminal 2 (device) and the edge server 3 (GW) at the second or subsequent connection. The processing in FIG. 24 is executed by the respective CPUs 11 of the terminal 2 and the edge server 3.

At processing of 141, the terminal 2 transmits an encryption communication request (Client Hello) in which a session ID is designated. At 142, the edge server 3 receives the encryption communication request. At 143, the edge server 3 determines whether session information corresponding to the session ID is stored in the distributed storage. If it is determined that the session information is not stored, the processing in FIG. 24 is finished. In this case, the processing is resumed from 121 in FIG. 22.

If it is determined that the session information corresponding to the session ID is stored at 143, the edge server 3 executes encryption communication procedure using the session information at 144. This at least allows the exchange of communication keys to be omitted, thereby shortening the encryption communication procedure.

At 145, the terminal 2 publishes (generates) a service request transaction after the encryption communication procedure with the edge server 3 has been finished, and transmits the service request transaction to the edge server 3. The processing the same as the processing at 123 and subsequent processing illustrated in FIG. 22 is thereafter executed, and thus an explanation of the processing is omitted.

Operation Example 2: Service Request and Service Processing Procedure (Device Authentication is Performed in SSL/TLS Protocol)

Figure 25:
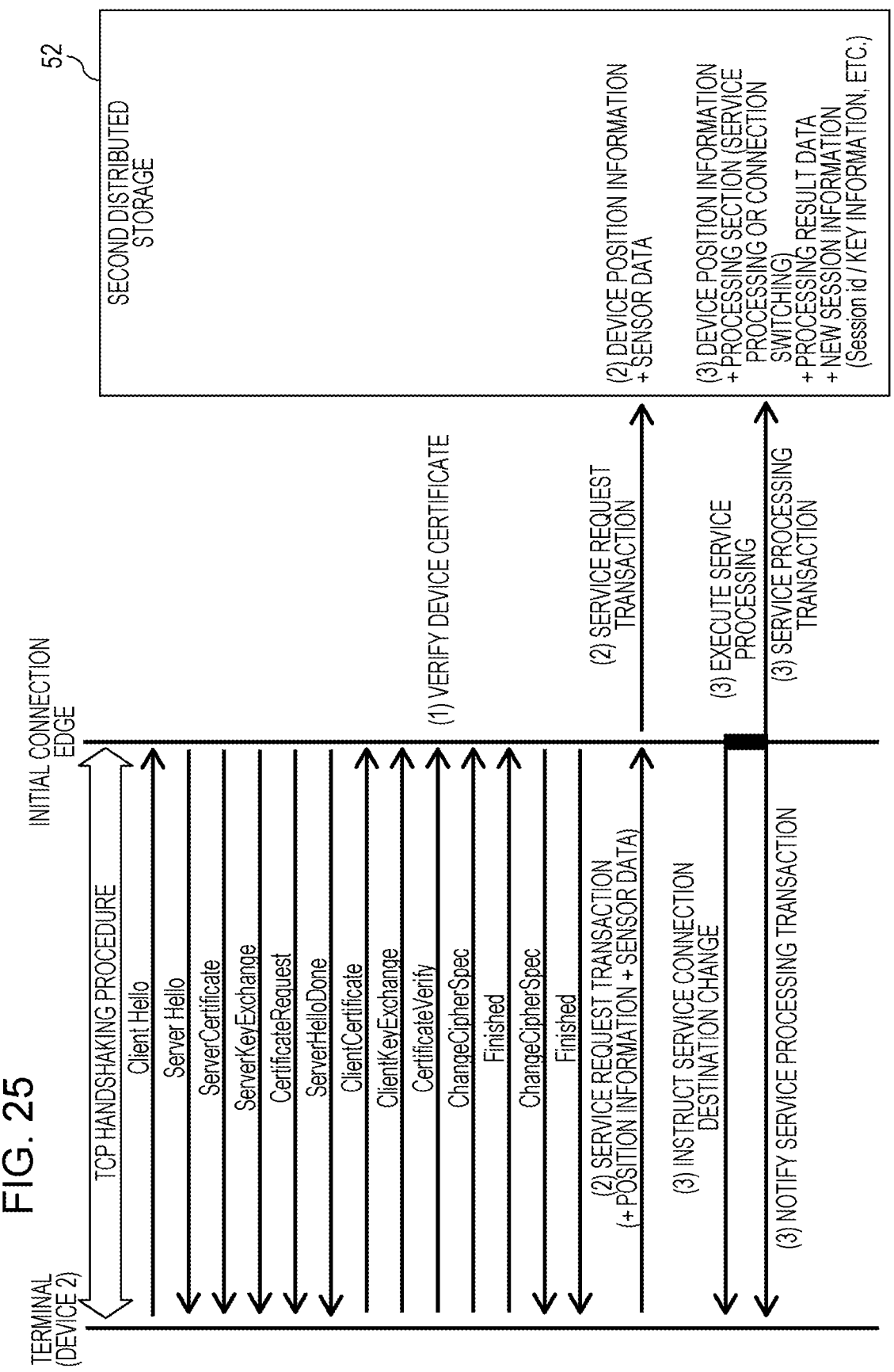
FIG. 25 is a sequence diagram according to an operation example.
Figure 26:
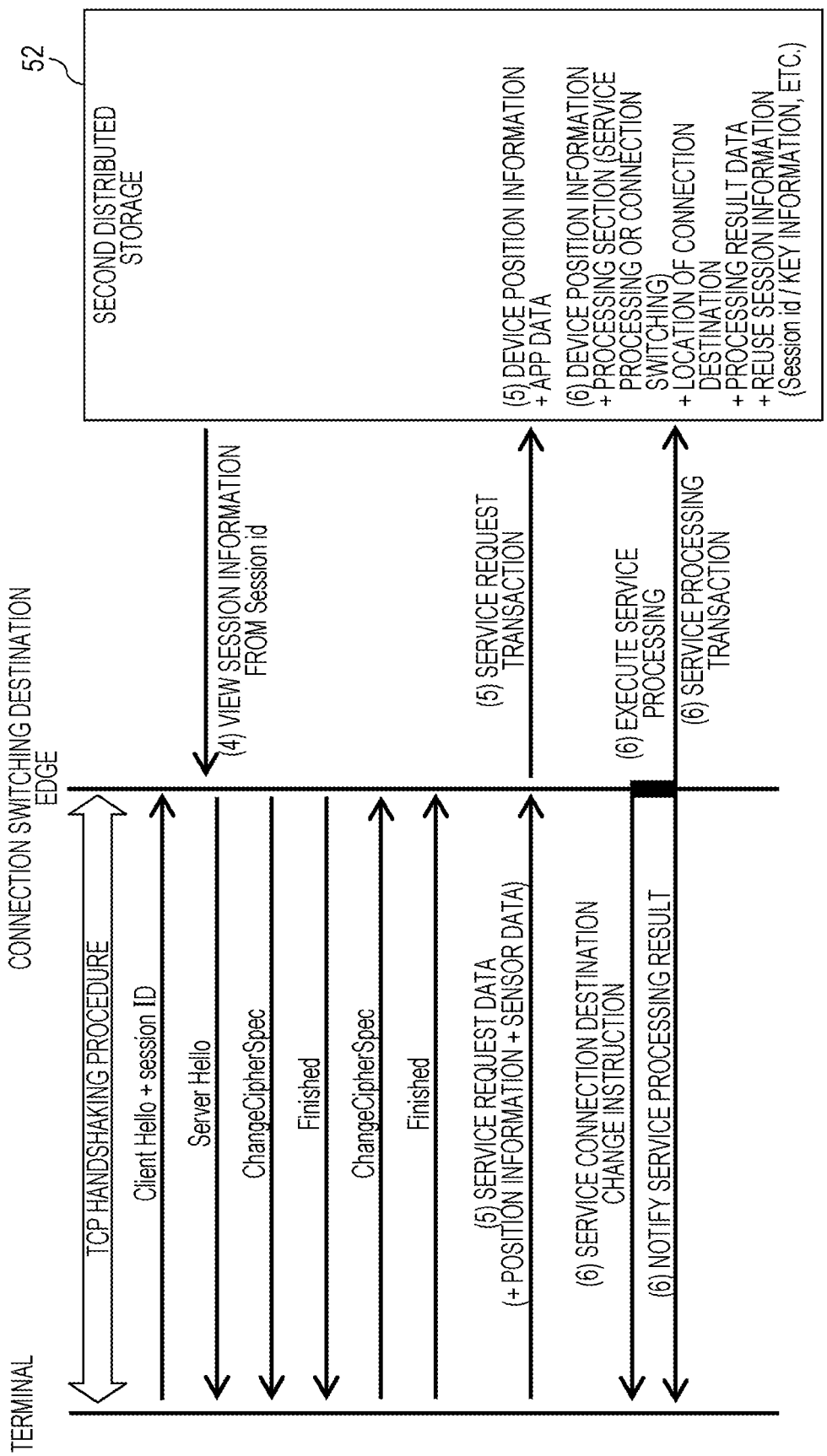
FIG. 26 is a sequence diagram according to the operation example.
Figure 27:
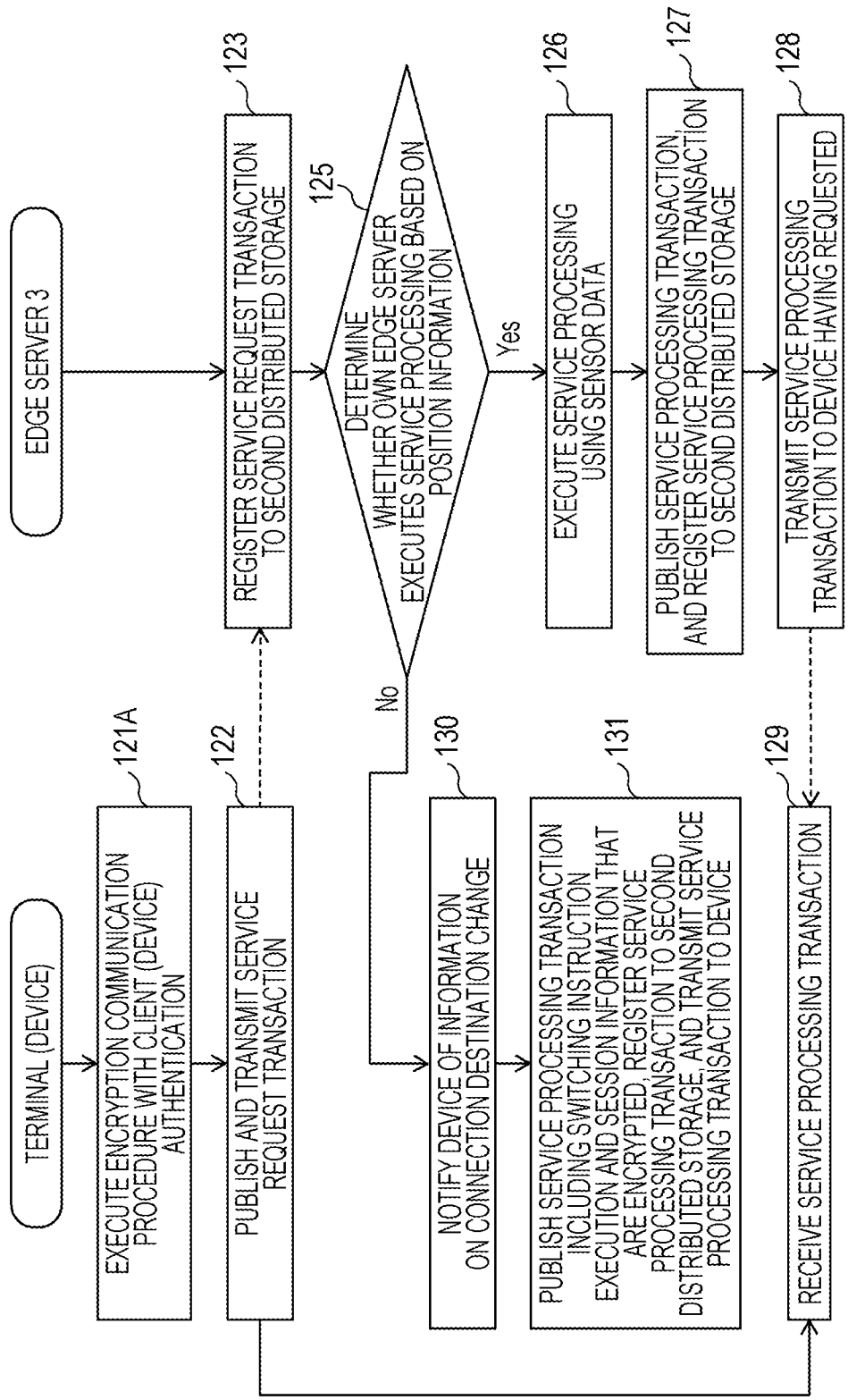
FIG. 27 is a flowchart illustrating a processing example of a CPU according to the operation example.

In an operation example 2, device authentication at the application side is not performed, but authentication is executed in an encryption communication protocol. FIG. 25 and FIG. 26 are sequence diagrams according to the operation example 2, and FIG. 27 is a flowchart illustrating a processing example of the CPU according to the operation example 2.

In FIG. 25, the terminal 2 (device) that desires communication executes an encryption key generation procedure with client authentication (negotiation of the SSL/TLS), to the destination GW (edge server 3) and the cloud (server 4), which are set for initial connection. The differences from the operation example 1 (FIG. 21) are as follows.

1. The edge server 3 transmits Certificate Request requesting a certificate for device authentication, to the terminal 2.
2. The terminal 2 transmits Client Certificate including a device certificate to the edge server 3, and transmits a signature (Certificate Verify) relating to the device certificate to the edge server 3. 3. The edge server 3 having received Certificate Verify verifies the signature using the device certificate, and determines whether the signature (device certificate) is valid.

Except the abovementioned differences 1 to 3, the processing of FIG. 25 according to the operation example 2 is the same as the processing in FIG. 21, and thus explanations thereof are omitted. Moreover, the processing in FIG. 26 according to the operation example 2 is the same as that in the operation example 1, except that (6) the device signature verification processing in the operation example 1 (FIG. 23) is not performed, and thus explanations thereof are omitted.

FIG. 27 is a flowchart illustrating a processing example of the CPU 11 according to the operation example 2. In the operation example 2, processing (encryption communication procedure with client authentication) is performed, instead of the processing (encryption communication procedure with no client authentication) at 121 in FIG. 22. Moreover, the processing (verification of the electronic signature) at 124 in the operation example 1 is not performed in the operation example 2. Except these points, the processing in the operation example 2 is the same as that in the operation example 1, and thus explanations thereof are omitted.

Operation Example 3

Figure 28:
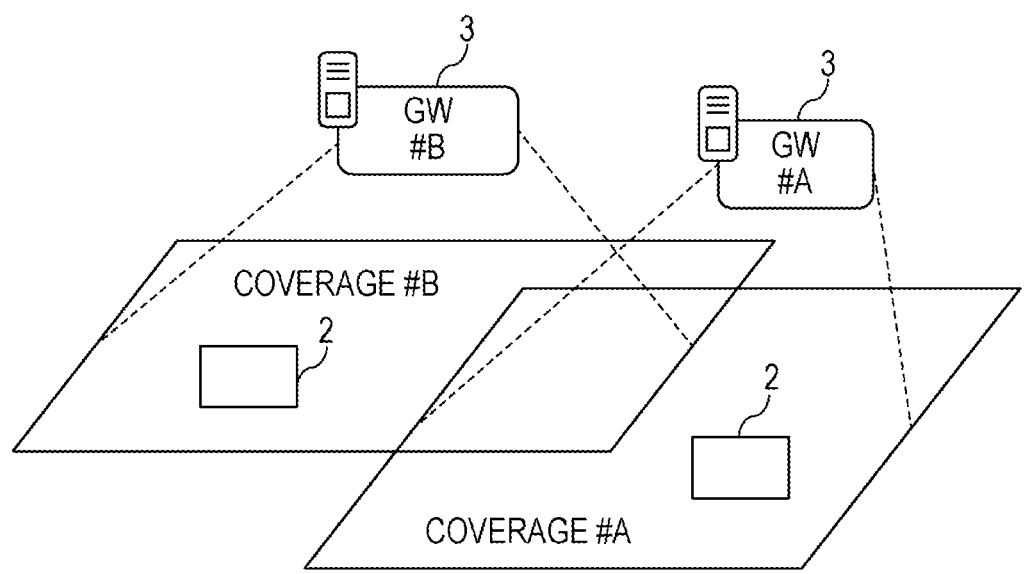
FIG. 28 is a diagram schematically illustrating a holding range (coverage) of transaction data.

As an operation example 3, a control of the holding range of transaction data including session information requested for encryption will be described using FIG. 28 and FIG. 29. FIG. 28 is a diagram schematically illustrating the holding range (coverage) of transaction data, and FIG. 29 is a flowchart illustrating a processing example executed by the CPU 11 of the edge server 3 (GW).

In the operation example 3, in accordance with position information on the terminal 2 (device) written in a service request transaction from the terminal 2 (device), the holding range of a transaction including random number information (for example, premaster secret and random number) requested for encryption of the terminal 2 (device) is limited to surrounding edge servers 3 (GWs). This keeps the edge server 3 (GW) from holding undesired transaction information.

Figure 29:
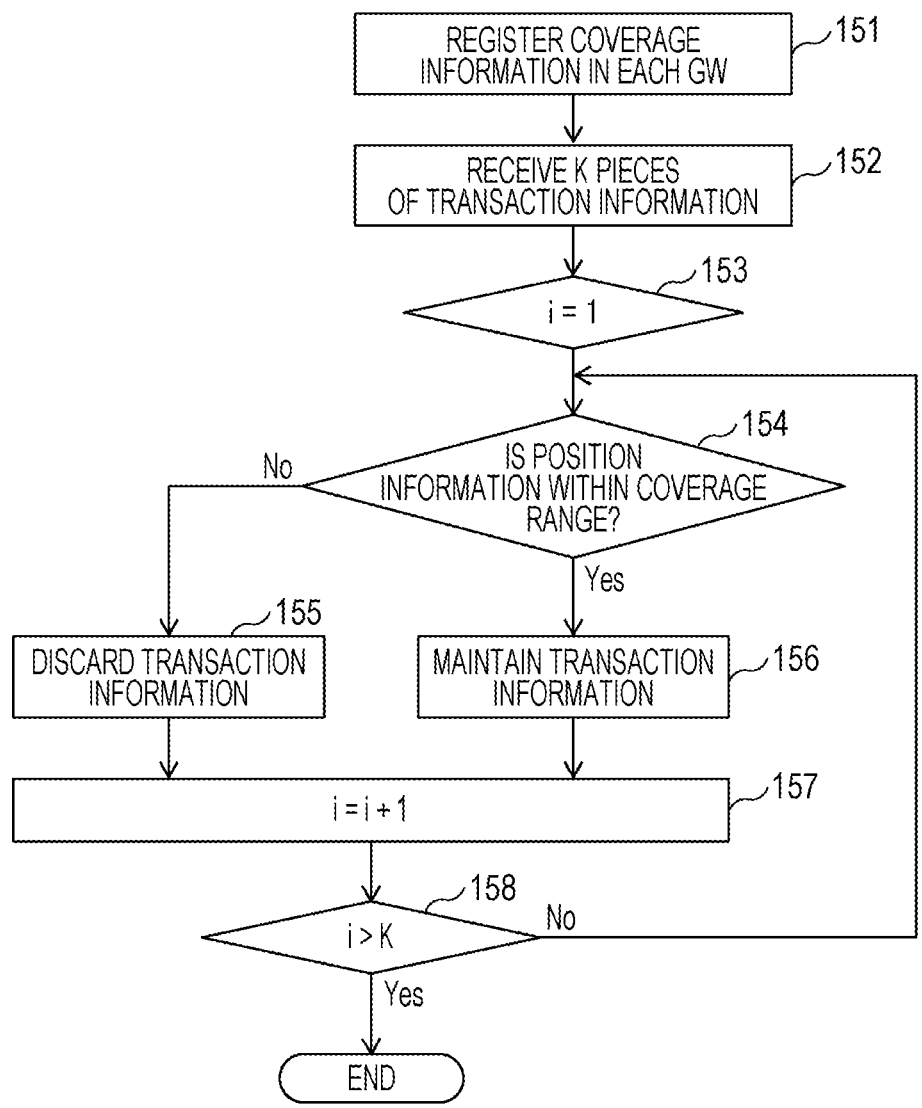
FIG. 29 is a flowchart illustrating a processing example executed by the CPU of the edge server (GW)

In processing at 151 in FIG. 29, the memory 12 of each edge server 3 (GW) stores therein a coverage definition DB 32 in which information on a management range (coverage) of a device that possesses session information is stored. As illustrated in FIG. 28, the coverage is a geographic area within a predetermined distance from a position of the edge server 3. The size and the shape of the coverage may be set as appropriate. The coverage may include an overlapping area. In the edge server 3 (GW) or the cloud (server 4), every time transaction information is registered in the second distributed storage 52, the copy of the transaction information is reflected to the memory 12 (the storage 21 or the storage 31) of the edge server 3 or the server 4.

For example, assumed that the edge server 3 obtains K pieces of transaction information including position information (at 152 in FIG. 29). In this case, the edge server 3 sets the value of a counter value i to an initial value "1" (153), extracts one transaction information, and determines whether the position information is within the range of the coverage (154). If it is determined that the position information is outside the range of the coverage, the transaction information is discarded (155). In contrast, if it is determined that position information is within the range of the coverage, the transaction information is maintained (156).

When the processing at 155 or 156 is performed, the counter value i is incremented (157). Thereafter, whether the counter value i is more than K is determined (158), and if i does not exceed K, the processing is returned to 154. This causes transaction information within the coverage range, out of the K pieces of transaction information, to remain in the memory 12, and the transaction information outside the range is discarded.

When the blockchain is utilized, with the mechanism of Simple Payment Verification (SPV) that allows a part of the transaction data to be possessed, the undesired transaction information having determined by the abovementioned method may be deleted.

<Cooperation with Other Service>

Sharing transaction (message) information on the distributed storage according to the embodiment is not limited to key information (session information on the encryption communication) of the SSL/TLS. For example, the sharing may be used for sharing key information generated based on a protocol other than the SSL/TLS, such as IPsec, on a distributed storage.

Moreover, disclosing encryption key information to a specific service enables a packet capturing device on a path through which encryption communication data between the terminal 2 (device) and the edge server 3 passes to decrypt and analyze encrypted data.

Moreover, a service provider may execute charge processing and others by referring to a processing history of service provided by the own provider.

In addition, as illustrated in FIG. 30, a firewall of a layer 7 (L7) is arranged in a gateway of the edge server 3 in some cases. The firewall (CPU that performs processing as a firewall by execution of a program) executes an inspection whether a payload section of a packet includes improper information. However, the payload section of a packet is encrypted in the encryption communication based on the SSL/TLS. This makes it difficult to inspect improper information present in the payload section.

In view of the abovementioned problem, the firewall acquires an encryption key (common key generated in the SSL/TLS) from session information managed in the distributed storage 52 to allow decrypt the encrypted payload section using information on the encryption key, thereby allowing improper information in the payload to be inspected.

Effects of Embodiment

The edge server 3 according to the embodiment is disposed between the cloud (server 4) and the terminal 2 requesting service to the cloud (server 4), with other edge servers 3. The edge server 3 includes a controller (CPU 11) that starts encryption communication with the terminal 2, when encryption key information generated before the request is included in shared information shared between the cloud (server 4) and at least one another edge server 3, using the encryption key information. Therefore, the processing related to generation of the encryption key may be omitted using the encryption key information, thereby making it possible to shorten the period of time before the communication is started.

The CPU 11 (an example of the controller) of the edge server 3 according to the embodiment performs processing of, when new encryption key information is generated with a terminal requesting a connection to the edge server 3, including the new encryption key information in the shared information (BC). Therefore, the encryption key information is shared between the cloud and the edge server 3, thereby allowing the edge server 3 or the cloud (server 4) to which a connection from the terminal 2 is thereafter requested to use the encryption key information.

The CPU 11 of the edge server 3 according to the embodiment generates transaction information including the new encryption key information, when the shared information is held in the form of the blockchain. The transaction information using the BC is managed by the BC to allow all the users to hold the record that may be monitored but difficult to be falsified.

The CPU 11 of the edge server 3 according to the embodiment receives, when a P public key, an S public key, a G public key are shared between the edge server 3 and a service provider, a secret key of the service and a certificate of the service having been encrypted by the service provider using the G public key. Therefore, the edge server 3 is allowed to receive the secure S secret key and service certificate. The edge server 3 may use the S secret key for generating a service approval transaction or a service processing transaction. Moreover, the service certificate is used for a procedure of the SSL/TLS. In other words, it is possible to give and receive information for the edge server 3 to perform instead of the cloud in a state where the secret state is secured.

The CPU 11 of the edge server 3 according to the embodiment receives a service application transaction from terminal 2 and includes the service application transaction in the shared information, when the D public key and the S public key are shared among the terminal 2, the edge server 3, and the cloud. The service application transaction designates the terminal 2 as a transmission source and the service as a destination, and includes a hash value and a signature of the terminal in which the hash value is encrypted using a secret key of the terminal 2. When the service application transaction included in the shared information is approved, the CPU 11 transmits the service approval transaction to the terminal. The service approval transaction designates the service as a transmission source and the terminal 2 as a destination, and includes information on the service application transaction as a hash, and a signature of the service in which the information on the service application transaction is encrypted with the S secret key. This enables a history of service application from the terminal 2 and a history of service approval may be managed as transactions in the BC.

The CPU 11 of the edge server 3 according to the embodiment receives a service request transaction from the terminal, and includes the service request transaction in the shared information. The service request transaction designates the terminal 2 as a transmission source and the service as a destination, and includes information on the service approval transaction as a hash, and a signature of the terminal in which the information on the service approval transaction is encrypted with the D secret key. The service request transaction further includes data (app data) to be processed in the service encrypted with the S public key. When the signature of the terminal 2 is valid, the CPU 11 includes a service processing transaction in the shared information, and transmits the service processing transaction to the terminal. The service processing transaction designates the service as a transmission source and the terminal 2 as a destination, and includes information on the service request transaction as a hash, and a signature of the service in which the information on the service request transaction is encrypted with the S secret key. The service request transaction further includes processing results of the service, which are respectively encrypted with the public key of the terminal 2 and the public key of the service. This enables a history of service request from the terminal 2 and a history of service processing may be managed as transactions in the BC.

The CPU 11 of the edge server 3 is allowed to verify the signature of the terminal 2 in the service request transaction using the public key of the terminal 2.

The CPU 11 of the edge server 3 is allowed to identify, based on position information on the terminal 2 included in the service request transaction, a connection destination (another edge server, or the cloud) of the terminal 2, other than the edge server 3, which performs processing corresponding to the service request transaction. In this case, the CPU 11 transmits a change instruction of the connection destination, and information indicating a location of the connection destination, to the terminal 2. This enables the terminal 2 to receive the service from the preferred connection destination from the position of the terminal 2.

The CPU 11 of the edge server 3 discards transaction information related to the terminal 2, when the position of the terminal 2 is outside a coverage where the edge server 3 manages the transaction information related to the terminal 2. Therefore, undesired transaction information is kept from being held. The configurations having described in the embodiment may be combined as appropriate.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An edge server disposed on an edge of a cloud network, the edge server comprising:
   a processor, wherein
   when encryption key information relating to a terminal, which requests both a connection to the edge server and the encryption key information generated before the request, is included in shared information shared between a cloud server and another edge server in the cloud network, the processor is configured to start encryption communication with the terminal using the encryption key information of the shared information,
   wherein when a public key of a service provider, a public key of a service provided by the service provider, and a public key of the edge server are shared between the edge server and the service provider, the processor performs processing of receiving a secret key of the service and a certificate of the service that having been encrypted by the service provider using the shared public key of the edge server, and wherein the processor further performs:
   when a public key of the terminal and the public key of the service are shared among the terminal, the edge server, and the cloud server, processing of receiving, from the terminal, a service application message which designates the terminal as a transmission source and the service as a destination, and includes a hash value and a signature of the terminal in which the hash value is encrypted using a secret key of the terminal, and including the service application message in the shared information, and
   when the service application message included in the shared information is approved, processing of transmitting, to the terminal, a service approval message which designates the service as a transmission source and the terminal as a destination, and includes information on the service application message as a hash, and a signature of the service in which the information on the service application message is encrypted using the secret key of the service.

2. The edge server according to claim 1, wherein when the processor is configured to generate new encryption key information with the terminal that requests the connection to the edge server, the processor performs processing of including the new encryption key information in the shared information.

3. The edge server according to claim 1, wherein when the shared information is held in a form of a blockchain, the processor is configured to generate transaction information including a new encryption key information.

4. The edge server according to claim 3, wherein when a position of the terminal is outside a coverage where the edge server manages transaction information related to the terminal the processor is configured to discard transaction information related to the terminal.

5. The edge server according to claim 1, wherein
   the processor further performs:
   processing of receiving, from the terminal, a service request message including information on the service approval message as a hash which designates the terminal as a transmission source and the service a destination, a signature of the terminal in which the information on the service approval message is encrypted using the secret key of the terminal, and data to be processed in the service encrypted with the public key of the service, and including the service request message in the shared information; and
   when the signature of the terminal is valid, processing of including, in the shared information, a service processing message which designates the service as a transmission source and the terminal as a destination, and includes information on the service request message as a hash, a signature of the service in which the information on the service request message is encrypted using the secret key of the service, and processing results of the service, which are respectively encrypted with the public key of the terminal and the public key of the service, and transmitting the service processing message to the terminal.

6. The edge server according to claim 5, wherein the processor is configured to verify the signature of the terminal in the service request message using the public key of the terminal.

7. The edge server according to claim 5, wherein
   when the processor is configured to identify a connection destination of the terminal, other than the edge server, which performs processing corresponding to the service request message based on position information on the terminal included in the service request message, the processor is configured to transmit a change instruction of the connection destination and information indicating a location of the connection destination, to the terminal.

8. An encryption communication control method of an edge server, including a processor, that is disposed on an edge of a cloud network and receives a service request from a terminal, the method comprising:

when encryption key information relating to the terminal, which requests both a connection to the edge server and the encryption key information generated before the request, is included in shared information shared between a cloud server and another edge server in the cloud network, starting, by the edge server, encryption communication with the terminal using the encryption key information, wherein when a public key of a service provider, a public key of a service provided by the service provider, and a public key of the edge server are shared between the edge server and the service provider, the processor performs processing of receiving a secret key of the service and a certificate of the service that having been encrypted by the service provider using the shared public key of the edge server, and wherein the method further comprises:

when a public key of the terminal and the public key of the service are shared among the terminal, the edge server, and the cloud server, processing of receiving, from the terminal, a service application message which designates the terminal as a transmission source and the service as a destination, and includes a hash value and a signature of the terminal in which the hash value is encrypted using a secret key of the terminal, and including the service application message in the shared information, and when the service application message included in the shared information is approved, processing of transmitting, to the terminal, a service approval message which designates the service as a transmission source and the terminal as a destination, and includes information on the service application message as a hash, and a signature of the service in which the information on the service application message is encrypted using the secret key of the service.

9. The encryption communication control method of claim 8, wherein when a position of the terminal is outside a coverage where the edge server manages information related to the terminal, the processor is configured to discard information related to the terminal.

10. A terminal configured to request a service to a cloud network, the terminal comprising:

a processor configured to perform:

processing of transmitting, to an edge server disposed on an edge of the cloud network and receiving a service request from the terminal, a request of both a connection to the edge server and designated information on encryption key information having been generated relating to the terminal before the request; and processing of starting encryption communication with the edge server, using the encryption key information acquired by the edge server, based on the designated information, from shared information shared between a cloud server and another edge server in the cloud network, processing of transmitting to the edge server a service application message which designates the terminal as a transmission source and the service as a destination, and includes a hash value and a signature of the terminal in which the hash value is encrypted using a secret key of the terminal, and including the service application message in the shared information, and processing of receiving from the edge server, a service approval message which designates the service as a transmission source and the terminal as a destination, and includes information on the service application message as a hash, and a signature of the service in which the information on the service application message is encrypted using the secret key of the service.

11. The terminal according to claim 10, wherein the designated information includes a session identifier.

12. The terminal of claim 10, wherein when a position of the terminal is outside a coverage where the edge server manages information related to the terminal, the edge server is configured to discard information related to the terminal.

* * * * *